US010086891B2

(12) United States Patent
Hung et al.

(10) Patent No.: US 10,086,891 B2
(45) Date of Patent: Oct. 2, 2018

(54) MODULAR ELECTRIC VEHICLE

(71) Applicant: NATIONAL TAIWAN NORMAL UNIVERSITY, Taipei (TW)

(72) Inventors: Yi-Hsuan Hung, Taipei (TW); Cheng-Sian Li, Taichung (TW); Min-Chen Cho, Taipei (TW); Hsueh-Chung Han, Tainan (TW); Chen-Wei Hu, Taipei (TW); Shao-Wei Chang, New Taipei (TW)

(73) Assignee: National Taiwan Normal University, Taipei (TW)

( * ) Notice: Subject to any disclaimer, the term of this patent is extended or adjusted under 35 U.S.C. 154(b) by 195 days.

(21) Appl. No.: 15/216,232

(22) Filed: Jul. 21, 2016

(65) Prior Publication Data

US 2017/0203801 A1    Jul. 20, 2017

(30) Foreign Application Priority Data

Jan. 20, 2016   (TW) .............................. 105101671 A
Jun. 15, 2016   (TW) .............................. 105118677 A

(51) Int. Cl.
*B60L 11/18*   (2006.01)
*B62D 63/02*   (2006.01)
*B62D 61/12*   (2006.01)

(52) U.S. Cl.
CPC ............ *B62D 63/025* (2013.01); *B60L 11/18* (2013.01); *B62D 61/12* (2013.01); *B60L 2200/46* (2013.01); *B60L 2220/46* (2013.01); *B60L 2260/28* (2013.01); *Y02T 10/7005* (2013.01)

(58) Field of Classification Search
CPC ...... B60L 11/18; B60L 2260/28; B62D 61/12; B62D 21/14; B62D 47/003
See application file for complete search history.

(56) References Cited

U.S. PATENT DOCUMENTS

| | | | | |
|---|---|---|---|---|
| 1,953,515 | A * | 4/1934 | Smith | B62D 21/12 180/11 |
| 4,283,086 | A * | 8/1981 | Morin | B62D 27/04 296/178 |
| 4,368,793 | A * | 1/1983 | Igarashi | B60S 9/215 180/11 |
| 4,887,859 | A * | 12/1989 | Aper | B62D 47/006 296/193.03 |
| 6,227,125 | B1 * | 5/2001 | Schroeder | B61D 17/045 105/329.1 |

(Continued)

*Primary Examiner* — Emma K Frick
*Assistant Examiner* — Brian L Cassidy
(74) *Attorney, Agent, or Firm* — Birch, Stewart, Kolasch & Birch, LLP

(57) ABSTRACT

A modular electric vehicle includes a first body module having a lateral connecting side, a second body module having a lateral connecting side, two first wheels mounted to the first body module, two second wheels mounted to the second body module, and a connection unit. The connection unit includes a first electrical connector disposed at the lateral connecting side of the first body module, and a second electrical connector disposed at the lateral connecting side of the second body module. The first electrical connector is operable to be selectively and electrically coupled to the second electrical connector, so that the first and second body modules can be selectively assembled to form a relatively light electric vehicle.

27 Claims, 22 Drawing Sheets

(56) References Cited

U.S. PATENT DOCUMENTS

| | | | | |
|---|---|---|---|---|
| 6,390,215 B1* | 5/2002 | Kodama | ................ | B60K 1/04 180/2.1 |
| 6,390,537 B1* | 5/2002 | DiGonis | ................ | B62D 21/14 29/401.1 |
| 6,490,980 B1* | 12/2002 | Mosby | ................ | B62D 53/04 105/397 |
| 6,896,319 B1* | 5/2005 | Huang | ................ | B62D 21/12 296/193.04 |
| 8,540,272 B1* | 9/2013 | Vitale | ................ | B62D 47/003 280/638 |
| 9,073,535 B2* | 7/2015 | Jenkins, Jr. | ................ | B60W 10/08 |
| 9,321,357 B2* | 4/2016 | Caldeira | ................ | B60L 11/1801 |
| 9,457,666 B2* | 10/2016 | Caldeira | ................ | B60L 3/0046 |
| 2003/0046802 A1* | 3/2003 | Chernoff | ................ | B60G 7/003 29/428 |
| 2004/0012162 A1* | 1/2004 | Burke | ................ | B60K 6/32 280/5.5 |
| 2004/0104568 A1* | 6/2004 | Tronville | ................ | B62D 21/02 280/781 |
| 2004/0256873 A1* | 12/2004 | McManus | ................ | B60P 3/40 296/26.01 |
| 2005/0116506 A1* | 6/2005 | Huang | ................ | B62D 21/12 296/193.04 |
| 2005/0279541 A1* | 12/2005 | Peters | ................ | B60K 7/0007 180/65.1 |
| 2006/0049652 A1* | 3/2006 | Martin | ................ | E04H 15/06 296/26.08 |
| 2006/0070790 A1* | 4/2006 | Kejha | ................ | B60K 6/442 180/311 |
| 2006/0076836 A1* | 4/2006 | Plishner | ................ | B60K 6/46 307/66 |
| 2007/0052261 A1* | 3/2007 | Andre | ................ | B62D 25/2036 296/193.04 |
| 2007/0138834 A1* | 6/2007 | Racz | ................ | B62D 33/0612 296/190.02 |
| 2010/0065344 A1* | 3/2010 | Collings, III | ................ | B60K 6/46 180/2.1 |
| 2010/0187031 A1* | 7/2010 | Waszak | ................ | B60L 11/02 180/65.265 |
| 2010/0252339 A1* | 10/2010 | Bibeau | ................ | B60K 6/26 180/12 |
| 2011/0079166 A1* | 4/2011 | Popa-Simil | ................ | B60K 16/00 105/1.4 |
| 2011/0169290 A1* | 7/2011 | Sheikhha | ................ | B60J 5/06 296/26.09 |
| 2011/0253463 A1* | 10/2011 | Smith | ................ | B60D 1/00 180/11 |
| 2012/0139292 A1* | 6/2012 | Hofer | ................ | B62D 63/025 296/181.1 |
| 2013/0240274 A1* | 9/2013 | Vitale | ................ | B62D 47/003 180/65.1 |
| 2013/0241236 A1* | 9/2013 | Vitale | ................ | B62D 21/14 296/193.04 |
| 2013/0257144 A1* | 10/2013 | Caldeira | ................ | B60L 11/1801 307/9.1 |
| 2014/0008897 A1* | 1/2014 | Tsukerman | ................ | B62D 21/14 280/657 |
| 2014/0062493 A1* | 3/2014 | Farrell | ................ | B60L 11/18 324/426 |
| 2014/0262583 A1* | 9/2014 | Url | ................ | B62D 63/025 180/233 |
| 2014/0315426 A1* | 10/2014 | Osawa | ................ | B60L 11/18 439/527 |
| 2014/0327332 A1* | 11/2014 | Genda | ................ | B60K 1/02 310/71 |
| 2014/0335711 A1* | 11/2014 | Lamb | ................ | H01R 13/633 439/258 |
| 2016/0129958 A1* | 5/2016 | Byrnes | ................ | B60L 15/20 180/12 |
| 2016/0207418 A1* | 7/2016 | Bergstrom | ................ | B60L 11/1879 |
| 2016/0257360 A1* | 9/2016 | MacKenzie | ................ | B62D 21/11 |
| 2017/0015370 A1* | 1/2017 | Goren | ................ | B62D 39/00 |

* cited by examiner

MODULAR ELECTRIC VEHICLE

CROSS-REFERENCE TO RELATED APPLICATION

This application claims priority of Taiwanese Patent Application No. 105101671, filed on Jan. 20, 2016, and Taiwanese Patent Application No. 105118677, filed on Jun. 15, 2016.

FIELD

The disclosure relates to an electric vehicle, and more particularly to a modular electric vehicle.

BACKGROUND

For an electric vehicle, the energy consumption thereof is closely related to the weight thereof. To reduce the weight of a conventional electric vehicle, several parts of the conventional electric vehicle were designed to be made of specific materials, such as aluminum alloy. However, the weight of the conventional electric vehicle cannot be effectively reduced simply by material selection.

SUMMARY

Therefore, an object of the disclosure is to provide a modular electric vehicle that can alleviate the drawback of the prior art.

According to the disclosure, the modular electric vehicle includes a vehicle body unit, a wheel unit, a driving unit, a power source unit, a connection unit and a controller. The vehicle body unit includes a first body module and a second body module. The first body module has a lateral connecting side. The second body module has a lateral connecting side. The wheel unit includes two first wheels that are mounted to the first body module and that are arranged in a front-rear direction, and two second wheels that are mounted to the second body module and that are arranged in the front-rear direction. The driving unit includes a first driving motor for driving rotation of one of the first wheels, and a second driving motor for driving rotation of one of the second wheels. The power source unit provides electrical power for driving the modular electric vehicle, and includes a first battery that is disposed on the first body module. The connection unit includes a first electrical connector that is disposed at the lateral connecting side of the first body module, and a second electrical connector that is disposed at the lateral connecting side of the second body module, that corresponds in position to the first electrical connector, and that is electrically coupled to the second driving motor. The controller is disposed at the first body module, and is electrically coupled to the first driving motor, the first battery and the first electrical connector. The first electrical connector is operable to be selectively and electrically coupled to the second electrical connector, so that the controller is able to be electrically coupled to the second driving motor by virtue of the first and second electrical connectors, and that the first battery provides electrical power to the controller and the first and second driving motors for driving the one of the first wheels and the one of the second wheels.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
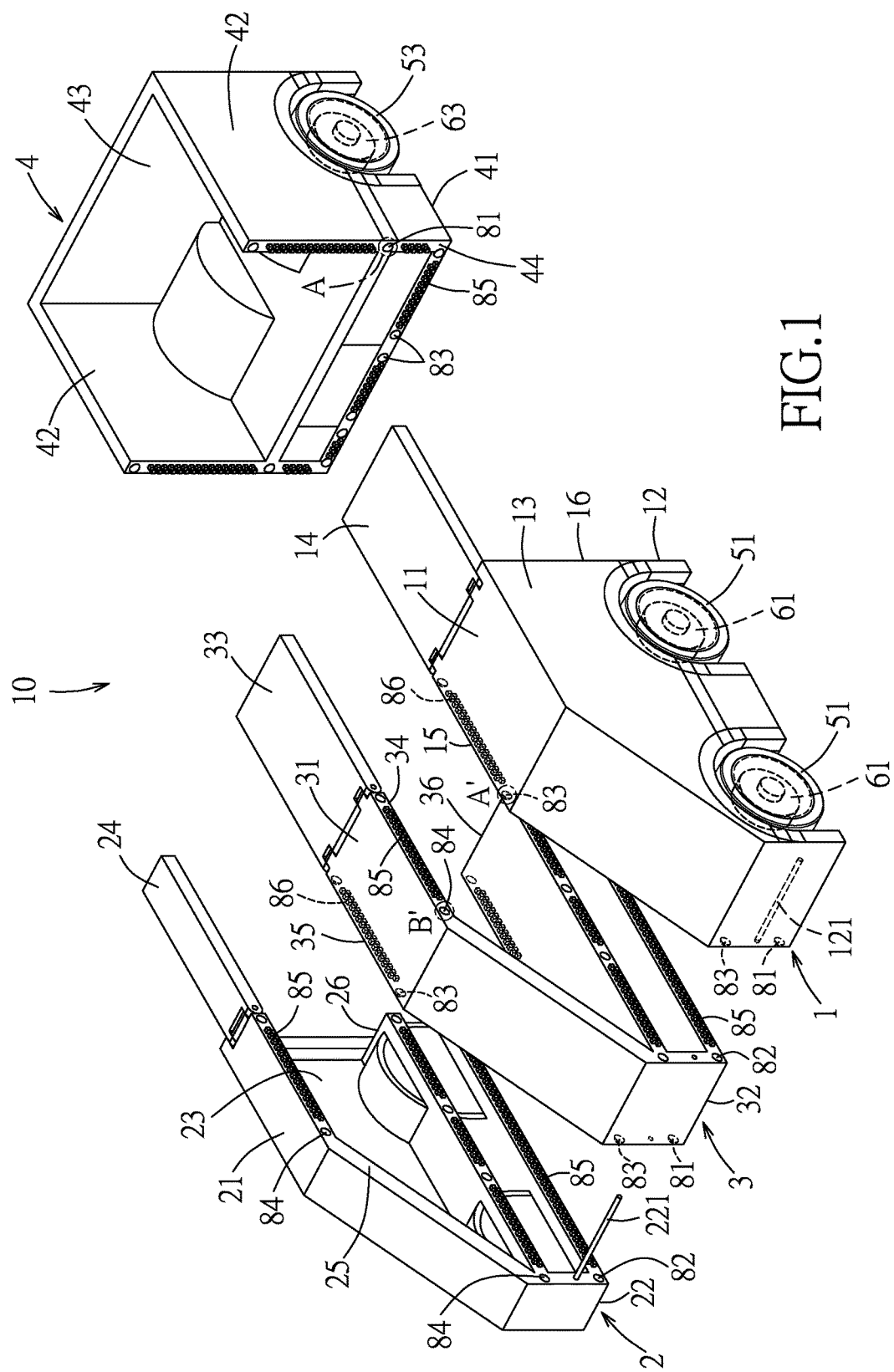
FIG. 1 is an exploded perspective view illustrating an embodiment of the modular electric vehicle according to the disclosure.

Referring to FIGS. 1 to 4, the embodiment of the modular electric vehicle according to the disclosure includes a vehicle body unit 10, a wheel unit 5, a driving unit 6, a power source unit 7, a connection unit 8 and a controller 9.

The vehicle body unit 10 includes a first body module 1, a second body module 2, a body module 3 and a fourth body module 4.

The first body module 1 has a first roof 11, a first chassis 12 that is spaced apart from the first roof 11 in a top-bottom direction, a lateral connecting side 15, a rear connecting side 16, a lateral wall 13 that is opposite to the lateral connecting side 15 in a lateral direction and that interconnects the first roof 11 and the first chassis 12, a slide groove 121 that is formed in the first chassis 12 and that opens at the lateral connecting side 15, and a first back plate 14 that is pivotally connected to an end of the first roof 11 proximate to the rear connecting side 16. In one embodiment, the lateral wall 13 may be provided with a side door.

The second body module 2 has a second roof 21, a second chassis 22 that is spaced apart from the second roof 21 in the top-bottom direction, a lateral connecting side 25, a rear connecting side 26, a lateral wall 23 that is opposite to the lateral connecting side 25 in the lateral direction and that interconnects the second roof 21 and the second chassis 22, a slide rod 221 that is connected to the second chassis 22 and that extends from the lateral connecting side 25 and away from the lateral wall 23, and a second back plate 24 that is pivotally connected to an end of the second roof 21 proximate to the rear connecting side 26. The slide rod 221 of the second body module 2 slidably and removably engages the slide groove 121 of the first body module 1. In one embodiment, the lateral wall 23 may be provided with a side door.

The third body module 3 has a third roof 31, a third chassis 32 that is spaced apart from the third roof 31 in the top-bottom direction, a first lateral connecting side 34, a second lateral connecting side 35 that is opposite to the first lateral connecting side 34 in the lateral direction, a rear connecting side 36, and a third back plate 33 that is pivotally connected to an end of the third roof 31 proximate to the rear connecting side 36.

The fourth body module 4 has a fourth chassis 41, two lateral walls 42 that respectively and upwardly extend from two opposite lateral edges of the fourth chassis 41, a rear wall 43 that extends upwardly from an rear edge of the fourth chassis 41 and that interconnects the lateral walls 42, and a front connecting side 44 that is opposite to the rear wall 43. In one embodiment, each of the lateral walls 42 may be provided with a side door.

Figure 16:
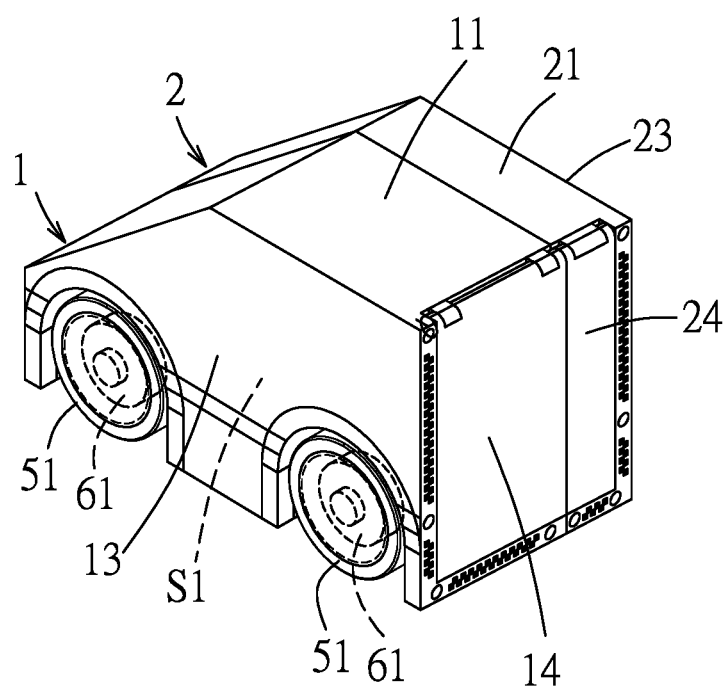
FIG. 16 is a schematic perspective view illustrating the vehicle body unit being assembled into a basic configuration.
Figure 17:
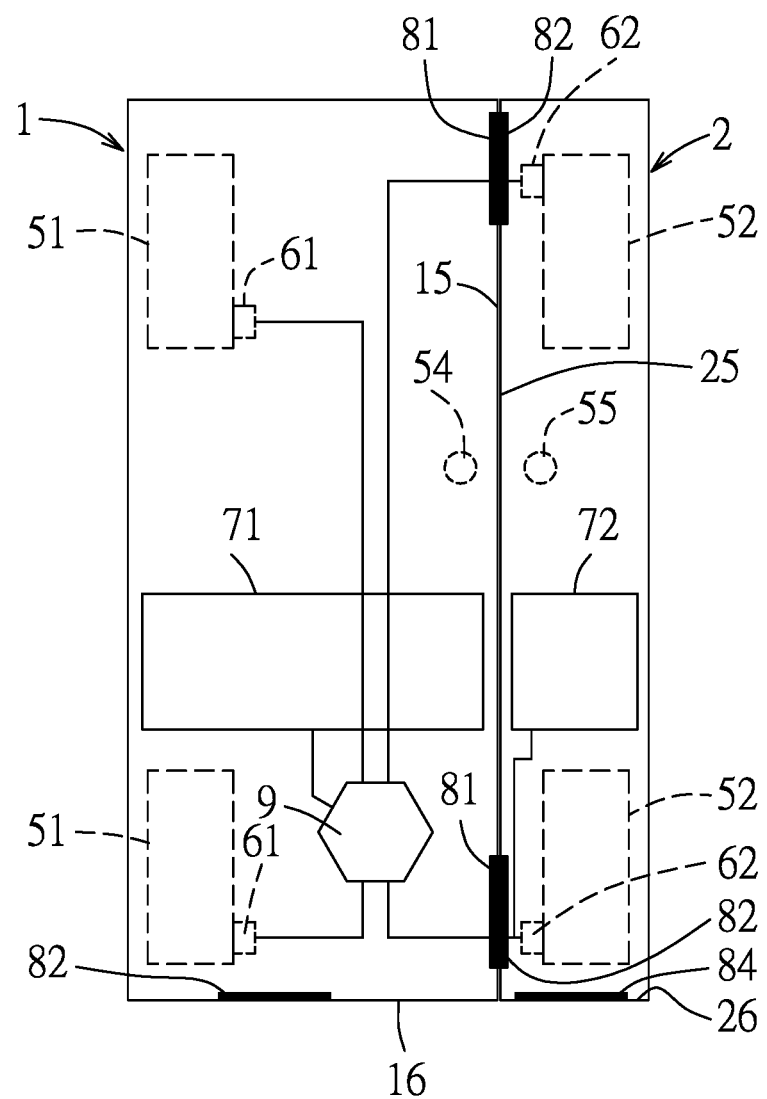
FIG. 17 is an assembled schematic view illustrating the arrangement of the embodiment when the vehicle body unit is assembled into the basic configuration.
Figure 18:
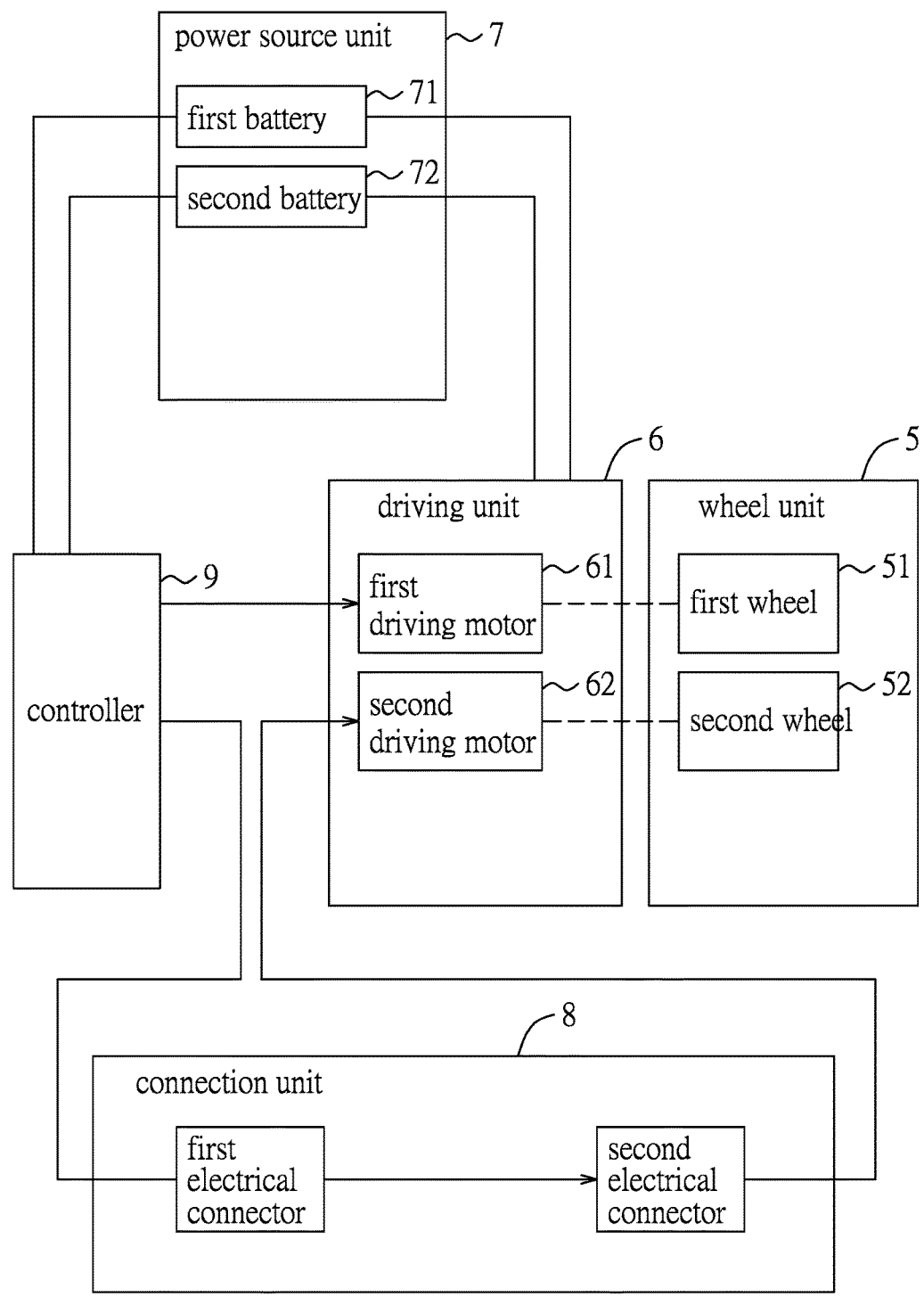
FIG. 18 is a block diagram illustrating the relationship among the wheel unit, the driving unit, the power source unit, the connection unit and the controller of the embodiment when the vehicle body unit is assembled into a basic configuration.
Figure 19:
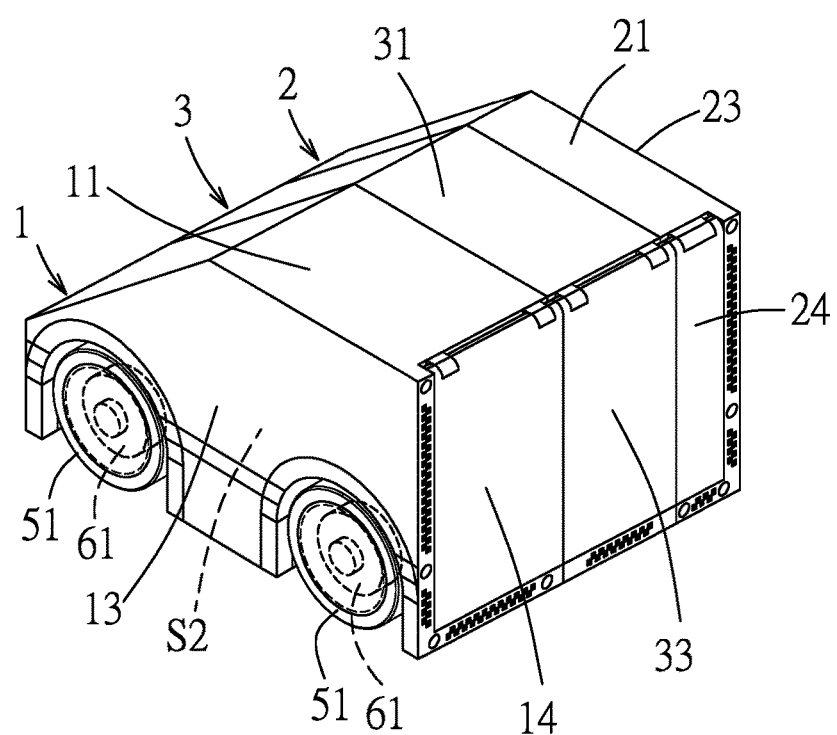
FIG. 19 is a schematic perspective view illustrating the vehicle body unit being assembled into a first augmented configuration.
Figure 20:
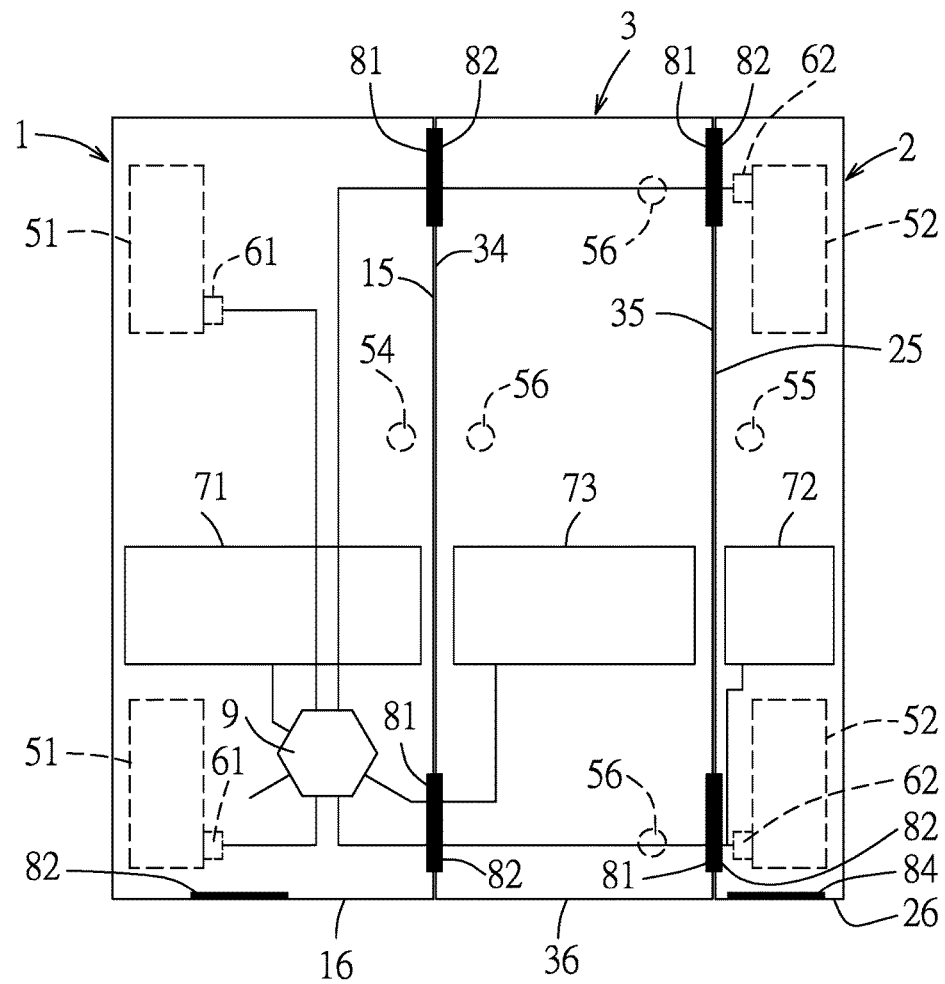
FIG. 20 is an assembled schematic view illustrating the arrangement of the embodiment when the vehicle body unit is assembled into the first augmented configuration.
Figure 21:
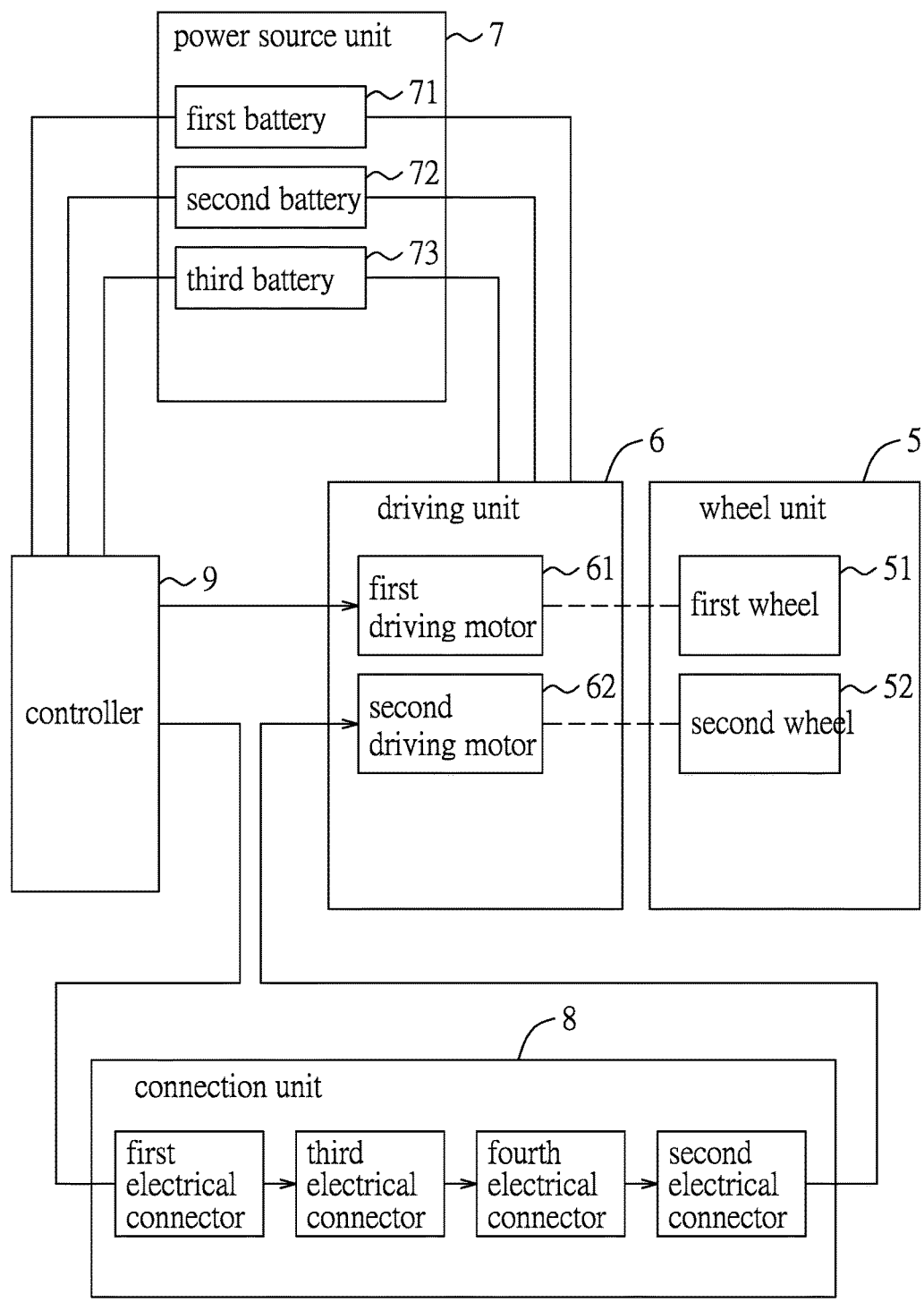
FIG. 21 is a block diagram illustrating the relationship among the wheel unit, the driving unit, the power source unit, the connection unit and the controller of the embodiment when the vehicle body unit is assembled into first augmented configuration.
Figure 22:
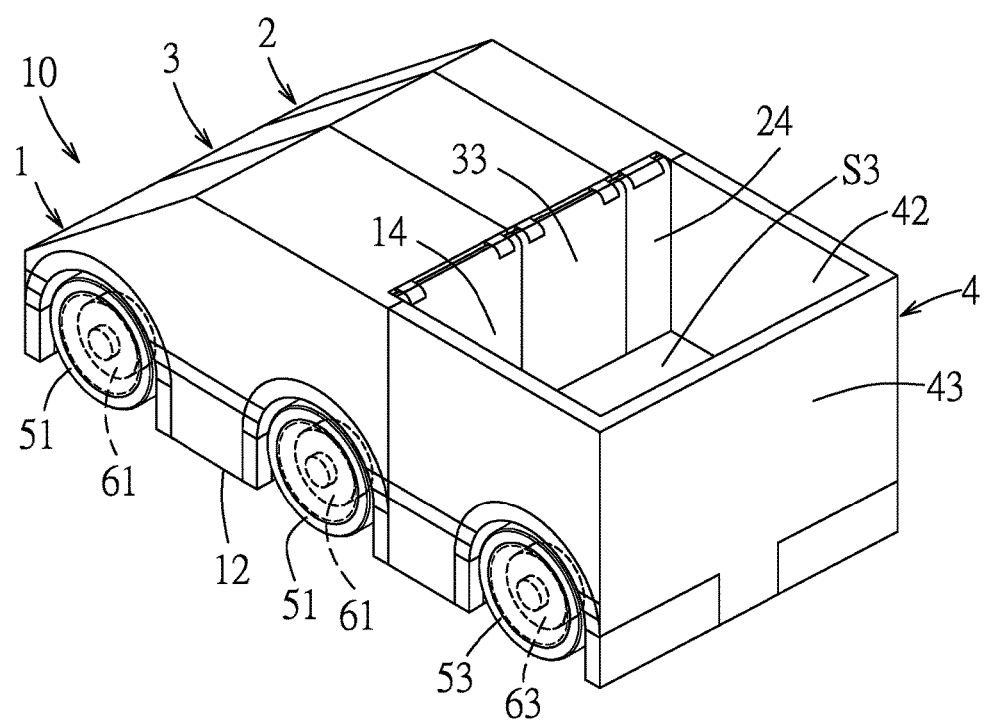
FIG. 22 is a perspective view illustrating a variation of the second augmented configuration of the vehicle body unit.

The vehicle body unit 10 can be selectively assembled into a basic configuration (see FIGS. 16 to 18), a first augmented configuration (see FIGS. 19 to 21) or a second augmented configuration (see FIGS. 3 to 7 and 22).

Figure 3:
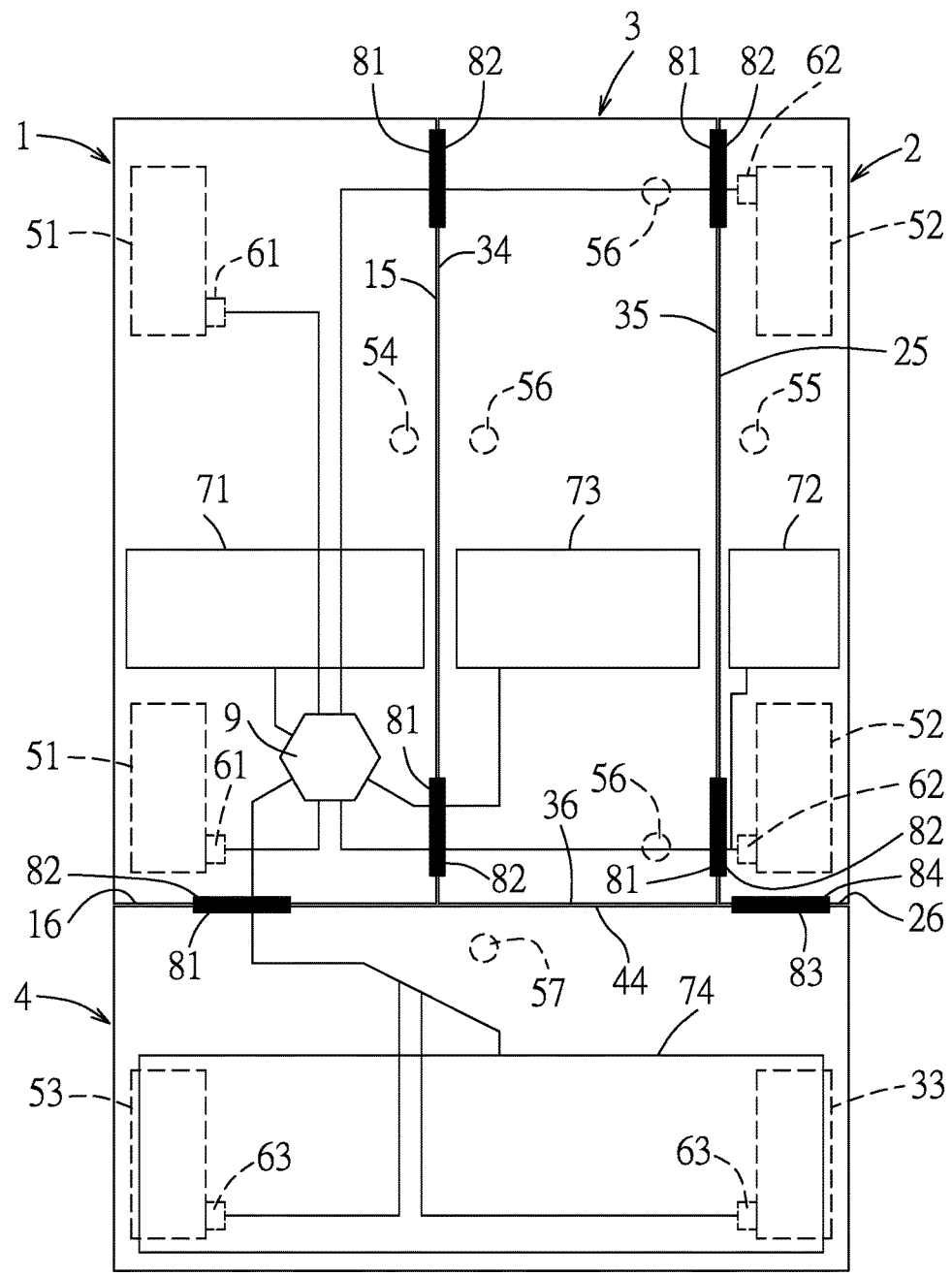
FIG. 3 is an assembled schematic view illustrating the arrangement of the embodiment when a vehicle body unit of the disclosure is assembled into a second augmented configuration.
Figure 6:
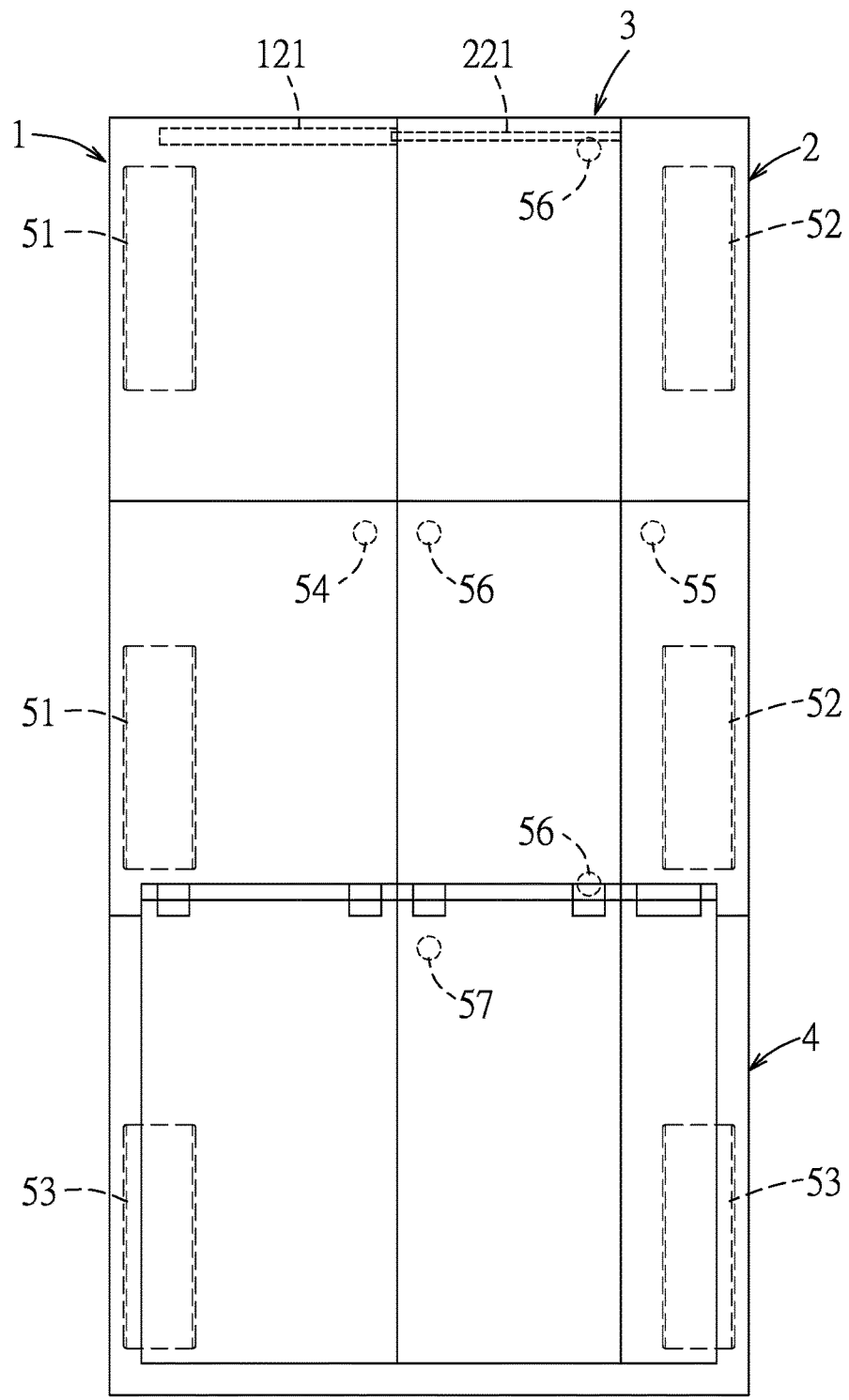
FIG. 6 is a schematic top view illustrating the second augmented configuration of the vehicle body unit.
Figure 7:
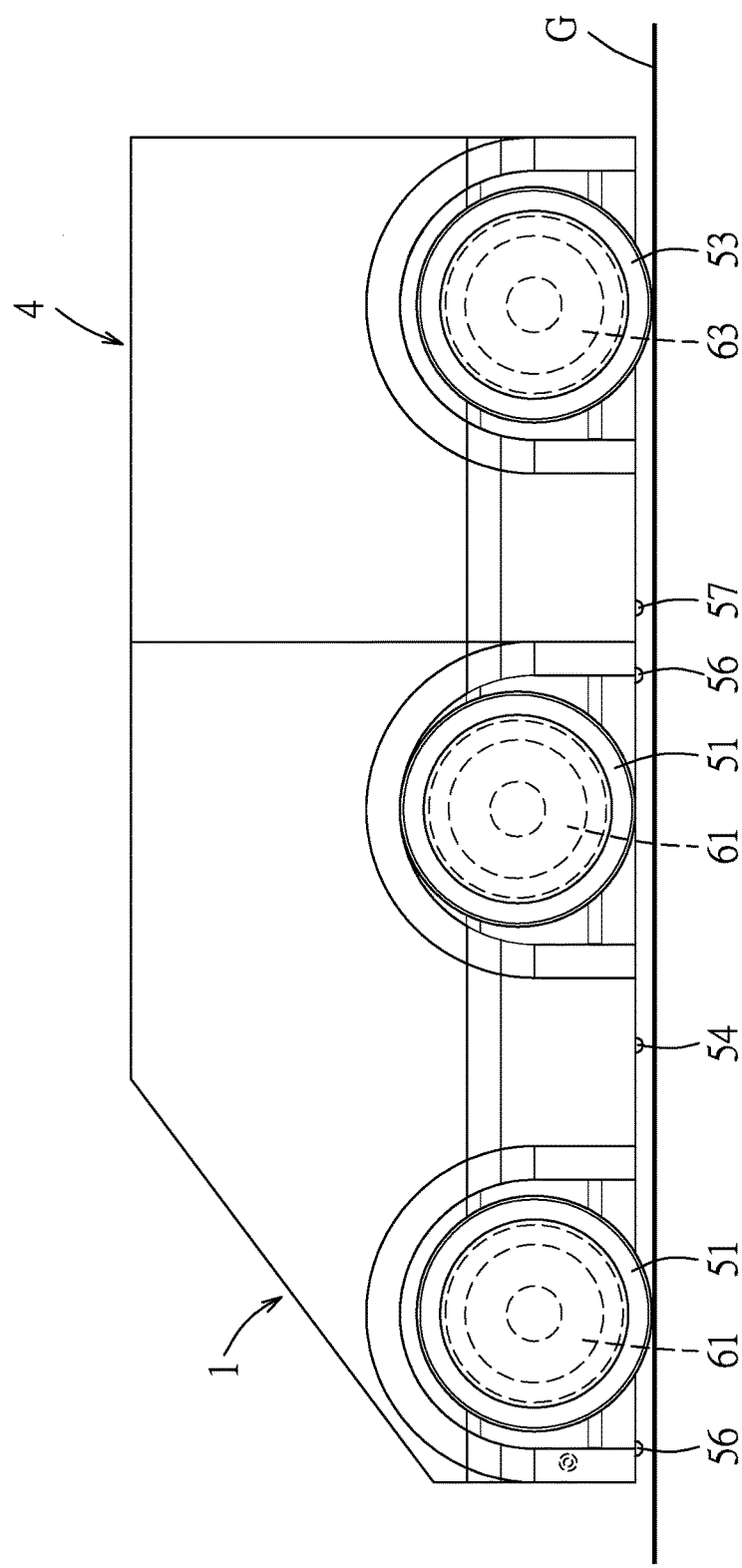
FIG. 7 is a schematic side view illustrating the second augmented configuration of the vehicle body unit.
Figure 8:
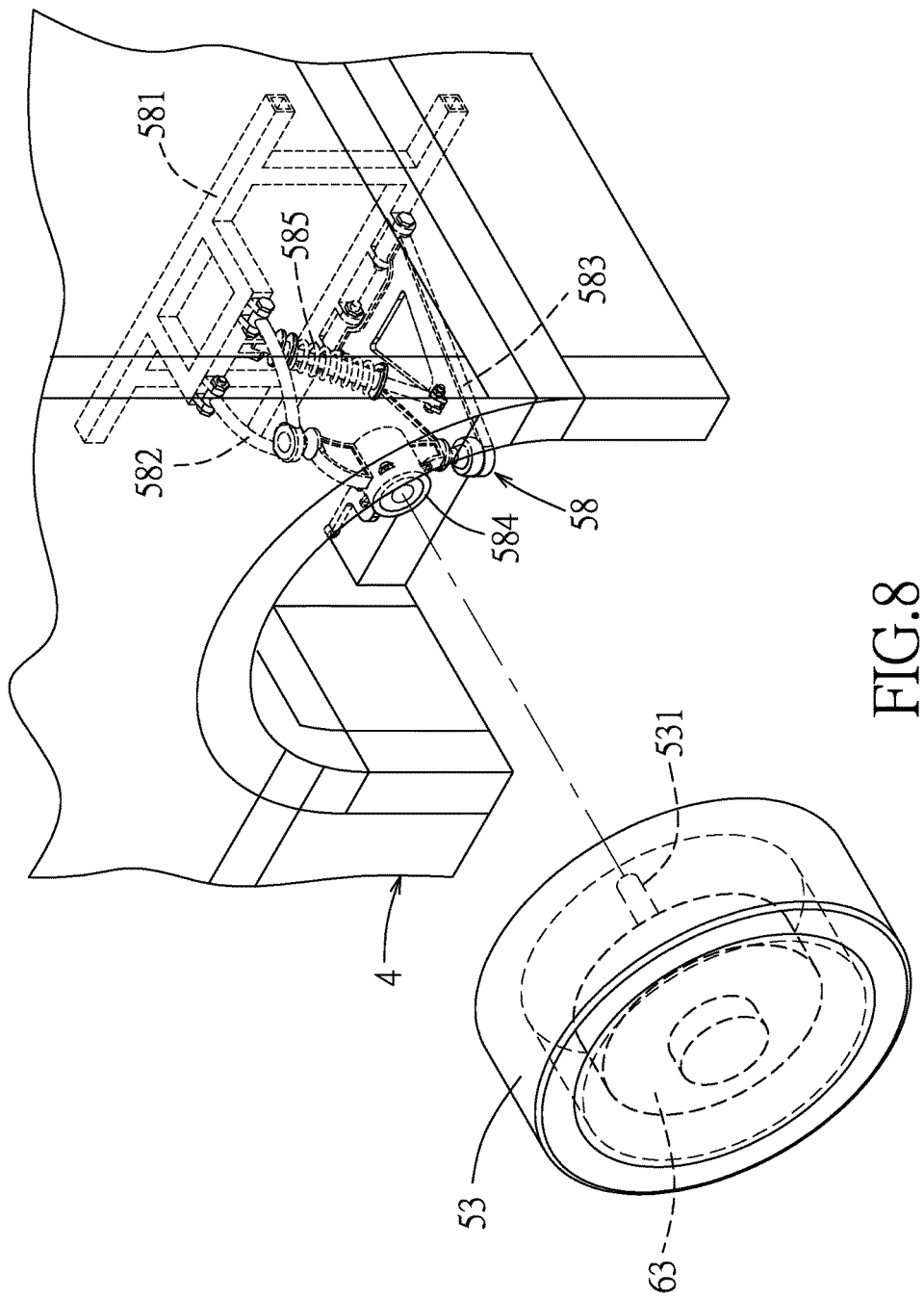
FIG. 8 is an exploded fragmentary perspective view illustrating a suspension mechanism and a third wheel of the embodiment.

Referring to FIGS. 1, 3 and 6, the wheel unit 5 includes two first wheels 51 that are mounted to the first body module 1 and that are arranged in a front-rear direction, two second wheels 52 that are mounted to the second body module 2 and that are arranged in the front-rear direction, two third wheels 53 that are mounted to the fourth body module 4 and that are spaced apart from each other in the lateral direction, a first auxiliary wheel 54 that is mounted to the first body module 1 and that is non-collinear with the first wheels 51, a second auxiliary wheel 55 that is mounted to the second body module 2 and that is non-collinear with the second wheels 52, three third auxiliary wheels 56 that are mounted to the third body module 3 and that are non-collinear with each other, a fourth auxiliary wheel 57 that is mounted to the fourth body module 4, and six suspension mechanisms 58 (only one is shown in FIG. 8). Each of the first, second and third wheels 51, 52, 53 is mounted to the corresponding one of the first, second and forth body modules 1, 2, 4 by virtue of a respective one of the suspension mechanisms 58.

Each of the suspension mechanisms 58 is operable to adjust the position of the corresponding one of the first, second and third wheels 51, 52, 53 relative to the corresponding one of the first, second and forth body modules 1, 2, 4. For the sake of brevity, one of the third wheels 53 and the corresponding suspension mechanism 58 are exemplified in FIG. 8. Note that each of the other suspension mechanisms 58 is similar to the exemplified suspension mechanism 58. The suspension mechanism 58 includes a bracket 81 that is fixedly mounted to the fourth body module 4, an upper arm 582 that is pivoted to an upper portion of the bracket 81, a lower arm 583 that is pivoted to a lower portion of the bracket 81 and that is longer than the upper arm 582, a support member 584 that is connected between the upper and lower arms 582, 583 and that is mounted with an axle portion 531 of the third wheel 53, and a resilient rod member 585 that has opposite ends respectively pivoted to the upper portion of the bracket 81 and the lower arm 583. In one embodiment, the resilient rod member 585 is configured as an adjustable shock absorber, and is adjustable in length. The lower arm 583 pivots relative to the bracket 81 upon the lengthwise adjustment of the resilient rod member 585, so as to move the support member 584 and the third wheel 53 relative to the fourth body module 4.

Figure 9:
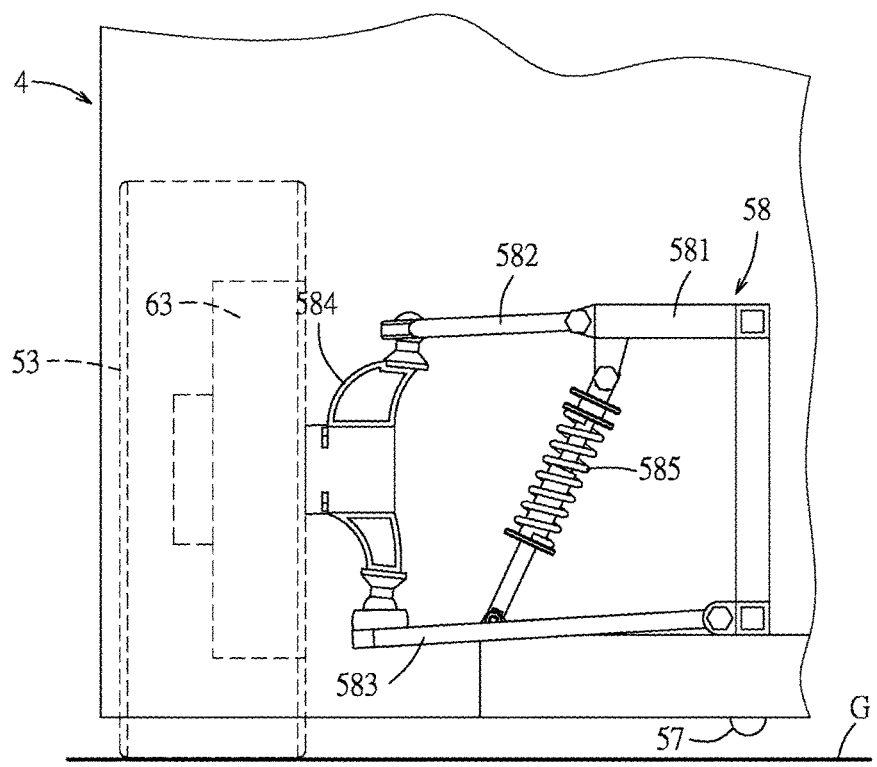
FIG. 9 is a schematic fragmentary rear view illustrating the suspension mechanism in an unfolded state.
Figure 10:
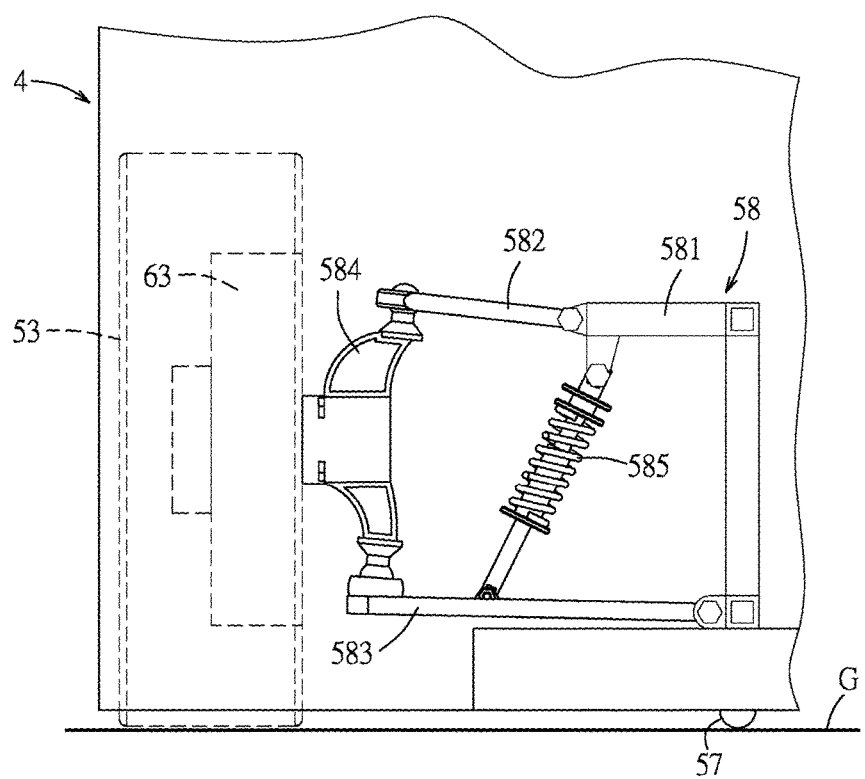
FIG. 10 is another schematic fragmentary rear view illustrating the suspension mechanism in a semi-folded state.
Figure 11:
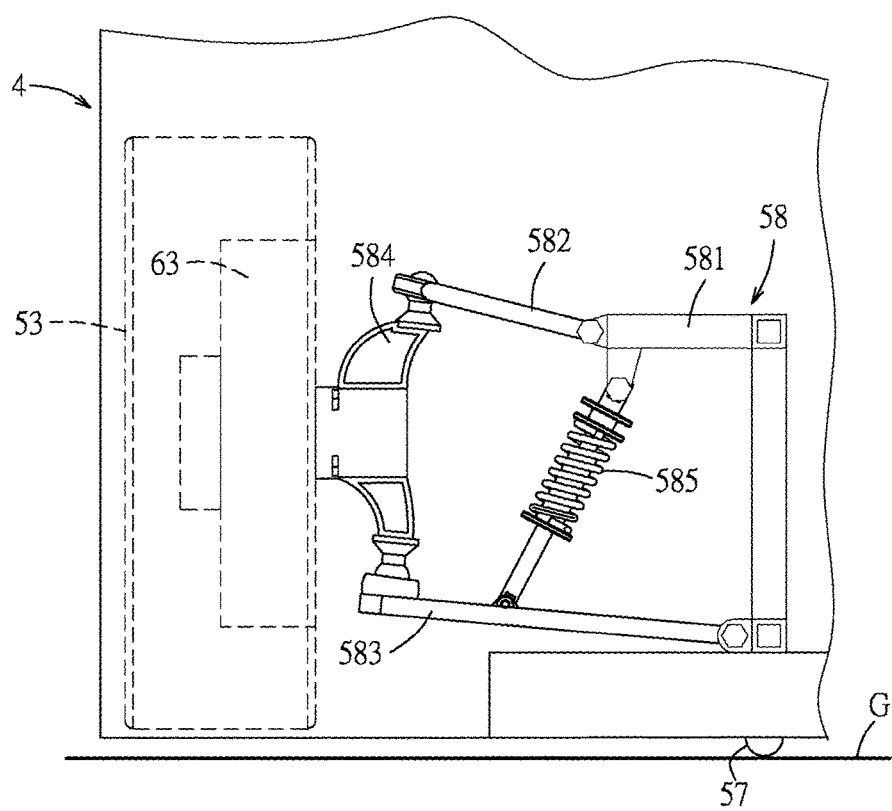
FIG. 11 is still another schematic fragmentary rear view illustrating the suspension mechanism in a folded state.
Figure 12:
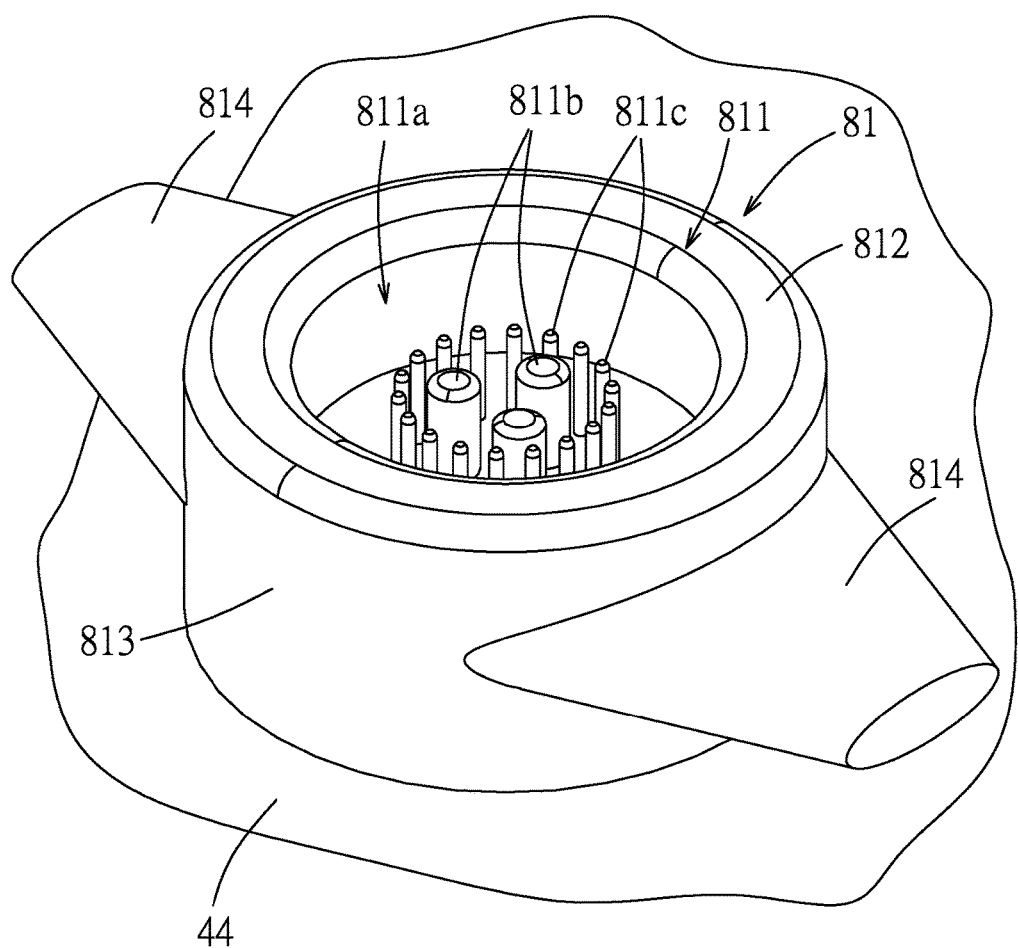
FIG. 12 is a fragmentary perspective view illustrating a male electrical connector of the disclosure.
Figure 13:
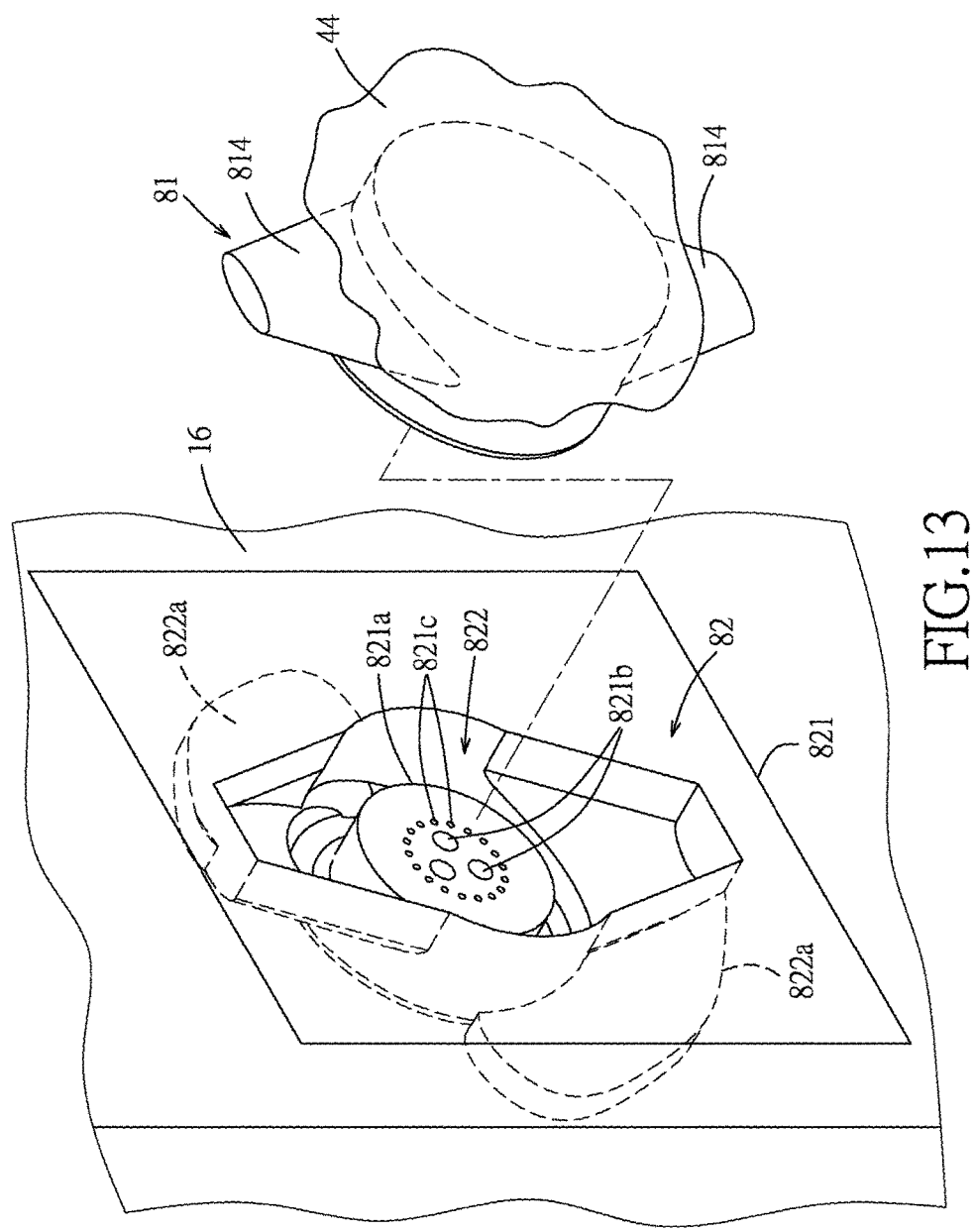
FIG. 13 is a fragmentary perspective view illustrating a female electrical connector and the male electrical connector of the disclosure.
Figure 14:
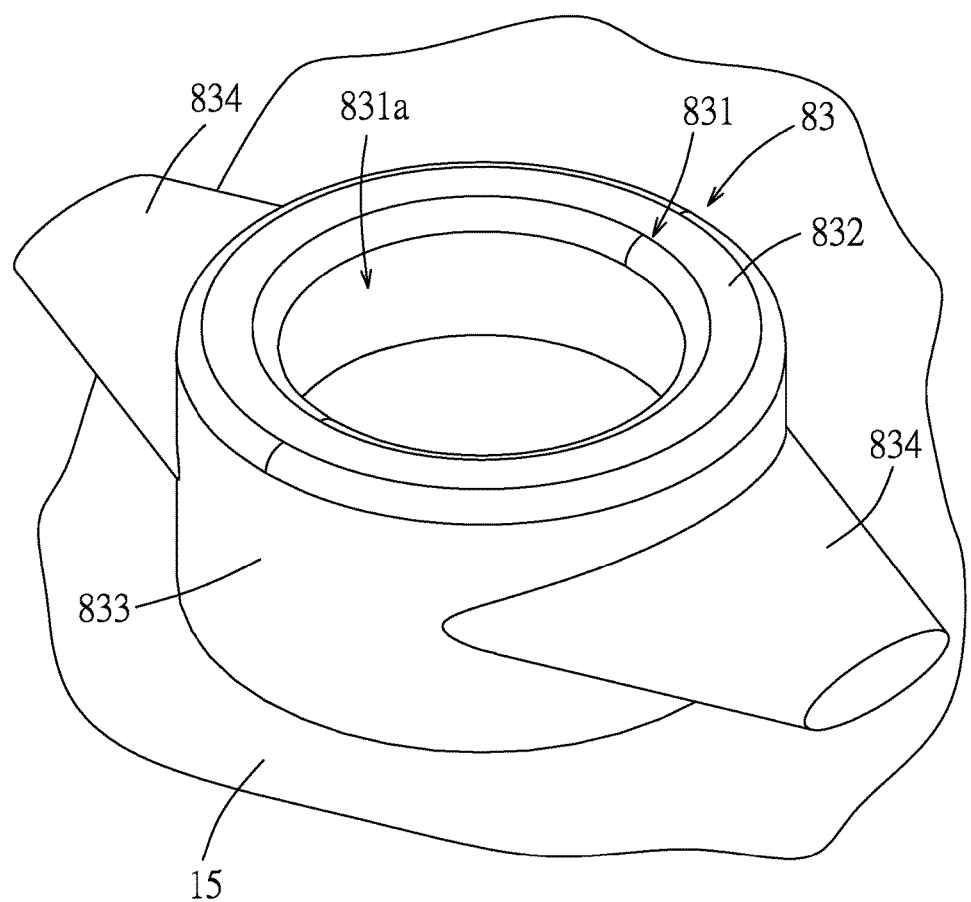
FIG. 14 is a fragmentary perspective view illustrating a male non-electrical connector of the disclosure.
Figure 15:
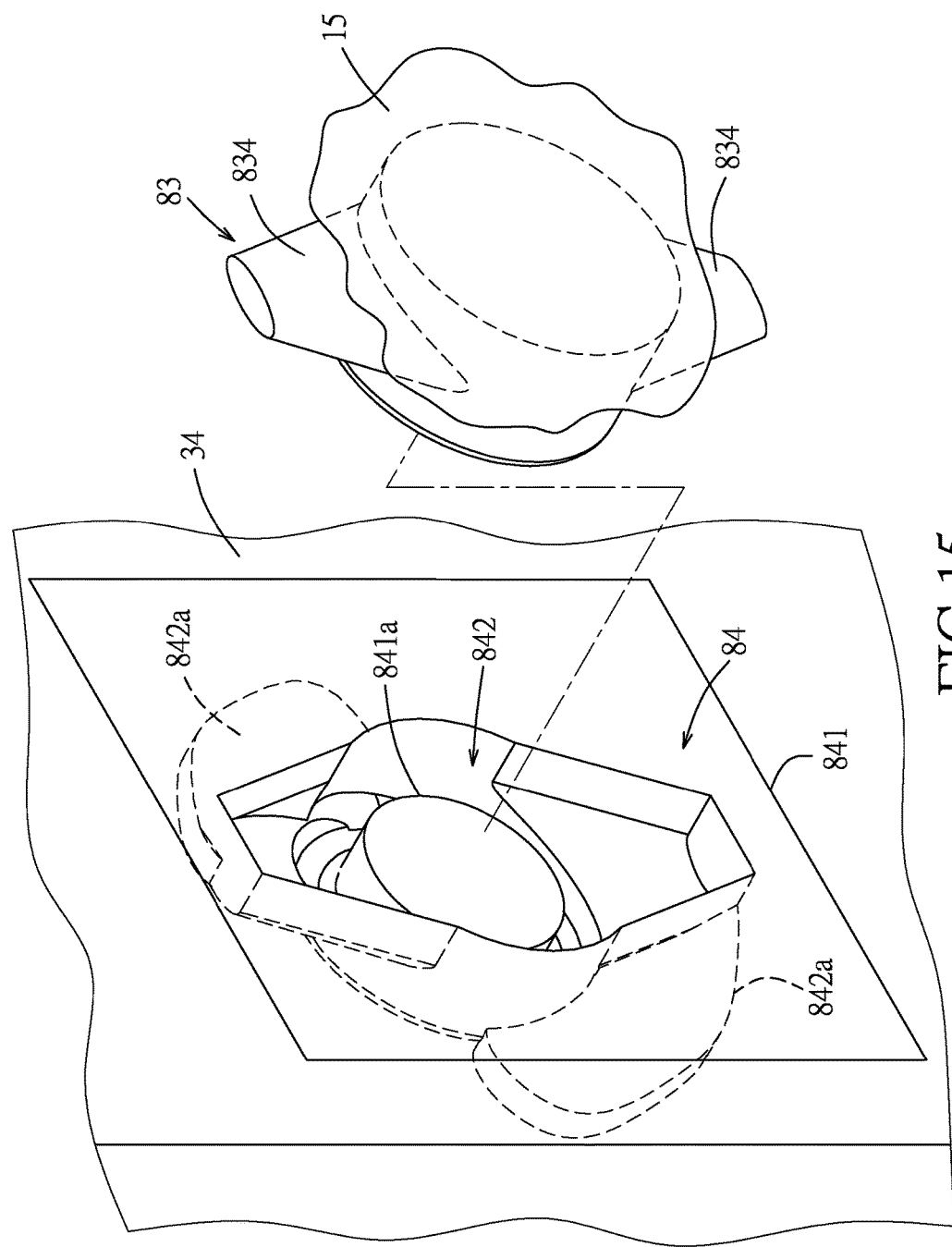
FIG. 15 is a fragmentary perspective view illustrating a female non-electrical connector and the male non-electrical connector of the disclosure.

In more detail, the suspension mechanism 58 is operable to switch among an unfolded state (see FIG. 9), a semi-folded state (see FIG. 10) and a folded state (see FIG. 11) upon the lengthwise adjustment of the resilient rod member 585. When the suspension mechanism 58 is in the unfolded state, the third wheel 53 is closer to a ground (G) than the fourth auxiliary wheel 57. For example, the third wheel 53 is in contact with the ground (G) and the fourth auxiliary wheel 57 is spaced apart from the ground (G) (see FIG. 9). When the suspension mechanism 58 is in the semi-folded state, lower ends of the third wheel 53 and the fourth auxiliary wheel 57 are at the same level. For example, both of the third wheel 53 and the fourth auxiliary wheel 57 are in contact with the ground (G) (see FIG. 10). When the suspension mechanism 58 is in the folded state, the fourth auxiliary wheel 57 is closer to the ground (G) than the third wheel 53. For example, the fourth auxiliary wheel 57 is in contact with the ground (G) and the third wheel 53 is spaced apart from the ground (G) (see FIG. 11). It should be noted that each of the other suspension mechanisms 58 functions like the suspension mechanism 58 exemplified in FIGS. 9 to 11.

Figure 4:
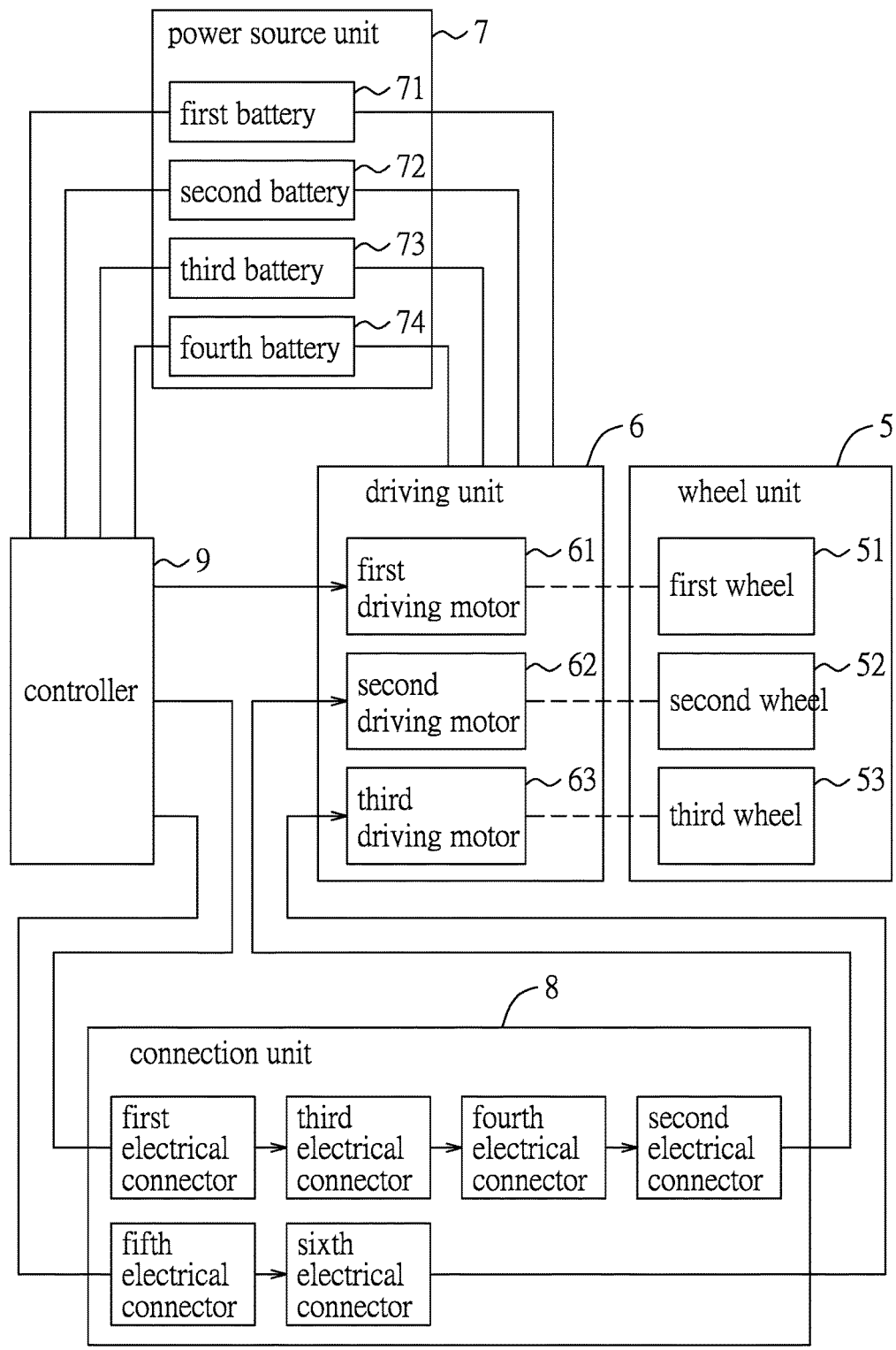
FIG. 4 is a block diagram illustrating the relationship among a wheel unit, a driving unit, a power source unit, a connection unit and a controller of the embodiment when the vehicle body unit is assembled into a second augmented configuration.

Referring to FIGS. 4 and 8, the driving unit 6 includes two first driving motors 61 that are respectively for driving rotations of the first wheels 51, two second driving motors 62 that are respectively for driving rotations of the second wheels 52, and two third driving motors 63 that are respectively for driving rotations of the third wheels 53. In a variation of the embodiment, the driving unit 6 may include only one first driving motor 61 that is for driving rotation of one of the first wheels 51, only one second driving motor 62 that is for driving rotation of one of the second wheels 52, and only one third driving motor 63 that is for driving rotation of one of the third wheels 53. In this embodiment, each of the first, second and third driving motors 61, 62, 63 is configured as a wheel hub motor, and is disposed between the corresponding one of the first, second and third wheels 51, 52, 53 and the corresponding suspension mechanism 58.

Referring to FIGS. 3 and 4, the power source unit 7 provides electrical power for driving the modular electric vehicle, and includes a first battery 71 that is disposed on the first body module 1, a second battery 72 that is disposed on the second body module 2, a third battery 73 that is disposed on the third body module 3, and a fourth battery 74 that is disposed on the fourth body module 4.

Figure 2:
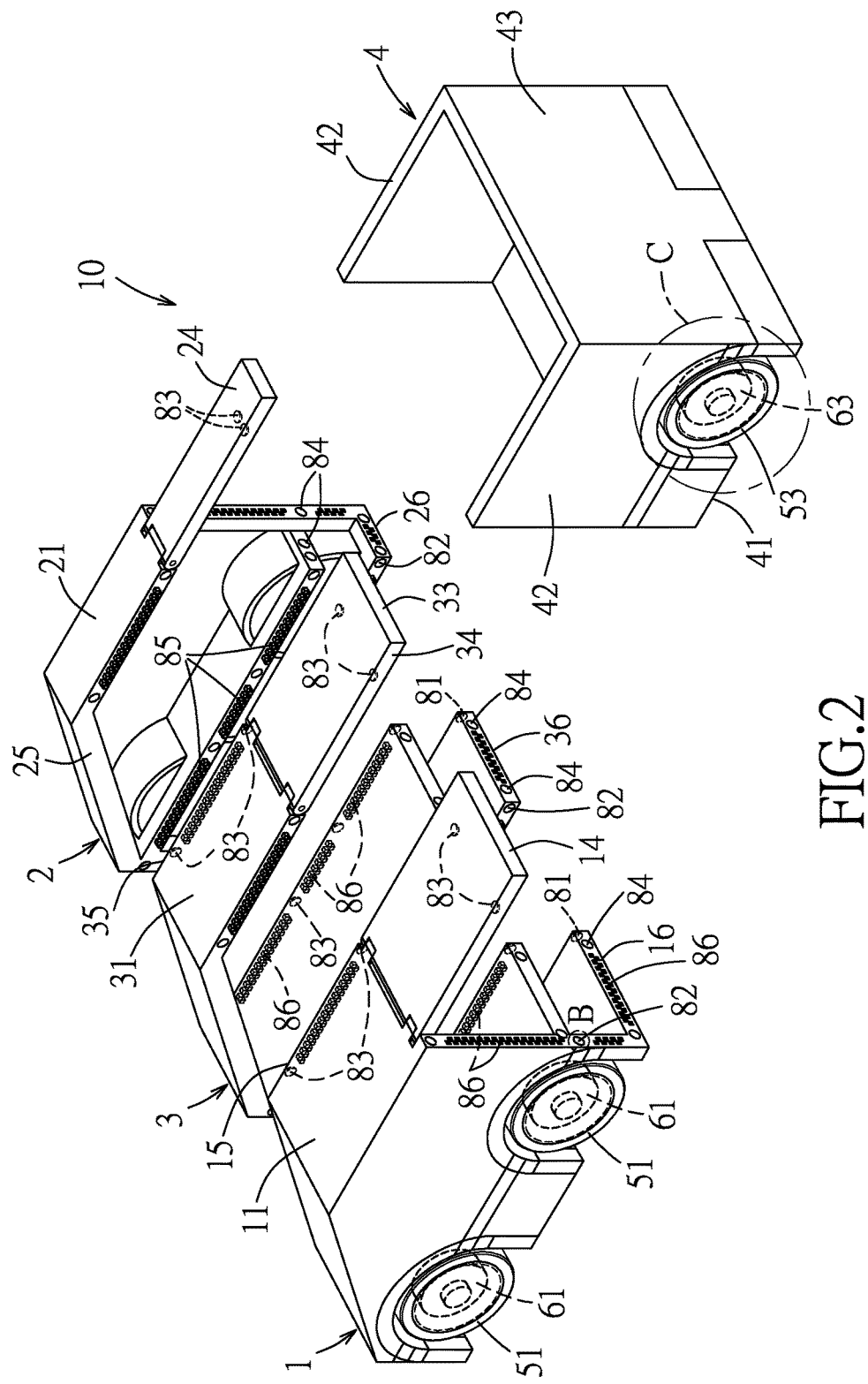
FIG. 2 is another exploded perspective view illustrating the embodiment.

Referring to FIGS. 1 to 3, the connection unit 8 includes two first electrical connectors, two second electrical connectors, two third electrical connectors, two fourth electrical connectors, a fifth electrical connector, a sixth electrical connector, six first non-electrical connectors, six second non-electrical connectors, six third non-electrical connectors, six fourth non-electrical connectors, nine fifth non-electrical connectors, nine sixth non-electrical connectors, two first back plate connectors, two first chassis connectors, two second back plate connectors, two second chassis connectors, two third back plate connectors, two third chassis connectors, a plurality of connecting blocks 85 and a plurality of connecting grooves 86.

The first electrical connectors are disposed at the lateral connecting side 15 of the first body module 1. The second electrical connectors are disposed at the lateral connecting side 25 of the second body module 2, correspond respectively in position to the first electrical connectors, and are electrically coupled to the second driving motors 62 and the second battery 72. The third electrical connectors are disposed at the first lateral connecting side 34 of the third body module 3, and correspond respectively in position to the first electrical connectors. The fourth electrical connectors are disposed at the second lateral connecting side 35 of the third body module 3, correspond respectively in position to the second electrical connectors, and are electrically coupled to the third electrical connectors and the third battery 73. The fifth electrical connector is disposed at the rear connecting side 16 of the first body module 1. The sixth electrical connector is disposed at the front connecting side 44 of the fourth body module 4, corresponds in position to the fifth electrical connector, and is electrically coupled to the third driving motors 62 and the fourth battery 74.

In this embodiment, each of the first, fourth and sixth electrical connectors is configured as a male electrical connector 81, and each of the second, third and fifth electrical connectors is configured as a female electrical connector 82 that is able to be coupled to the male electrical connector 81. The locations of each corresponding pair of the male and female electrical connectors 81, 82 are interchangeable. Note that, in FIGS. 1 and 2, each of the male electrical connectors 81 is expressed by a hemisphere, and each of the female electrical connectors 82 is expressed by a circle.

For the sake of brevity, only the fifth and sixth electrical connectors are described in the following paragraphs. Referring to FIGS. 1, 2, 12 and 13, the sixth electrical connector (i.e., the male electrical connector 81) includes an inner terminal seat 811, and an outer connecting seat that is rotatably sleeved on the inner terminal seat 811. The inner terminal seat 811 is fixedly disposed on the front connecting side 44 of the fourth body module 4, and is formed with a recess 811a. The sixth electrical connector further includes a plurality of current terminals 811b (i.e., conductive terminals) extending from a recess-defining-surface that defines the recess 811a, and a plurality of signal terminals 811c (i.e., conductive terminals) extending from the recess-defining-surface and surrounding the current terminals 811b. The outer connecting seat includes a rotating section 812, a casing section 813 and two wing sections 814. The rotating section 812 is rotatably sleeved on the inner terminal seat 811. The casing section 813 is co-rotatably sleeved on the rotating section 812. The wing sections 814 respectively extend radially and outwardly from two diametrically opposite sides of the casing section 813.

The fifth electrical connector (i.e., the female electrical connector 82) includes a mounting seat 821 that is disposed in the rear connecting side 16 of the first body module 1. The mounting seat 821 has a retaining groove 822 that is formed in an outer surface of the mounting seat 821 and that is shaped to be substantially complementary to the sixth electrical connector, and a protrusion 821a that is disposed in the retaining groove 822 and that is able to engage the recess 811a of the inner terminal seat 811 of the sixth electrical connector. The protrusion 821a is formed with a plurality of current terminal holes 821b (i.e., terminal holes) that are in spatial communication with the retaining groove 822 and that are respectively for being inserted by the current terminals 811b of the sixth electrical connector, and a plurality of signal terminal holes 821c (i.e., terminal holes) that are respectively for being inserted by the signal terminals 811c of the sixth electrical connector. The fifth electrical connector further includes a plurality of electrical contacts (not shown) that are respectively disposed in the current terminal holes 821b and the signal terminal holes 821c. The retaining groove 822 has two extending groove portions 822a that are respectively located at two diametrically opposite sides of the protrusion 821a and extend about the protrusion 821a.

To couple the fifth and sixth electrical connectors together, the outer connecting seat of the sixth electrical connector is inserted into the retaining groove 822 of the fifth electrical connector, so that the current terminals 811b and the signal terminals 811c are respectively inserted into the current terminal holes 821b and the signal terminal holes 821c, and are respectively in contact with the electrical contacts to permit electrical power transmission and signal transmission between the fifth and sixth electrical connectors. Then, the outer connecting seat is rotated by an electromechanical control manner to respectively engage the wing sections 814 with the extending groove portions 822a, so as to maintain the electrical connection between the fifth and sixth electrical connectors.

Referring to FIGS. 1 to 3, the first non-electrical connectors are disposed at the lateral connecting side 15 of the first body module 1. The second non-electrical connectors are disposed at the lateral connecting side 25 of the second body module 2, and correspond respectively in position to the first non-electrical connectors. The third non-electrical connectors are disposed at the first lateral connecting side 34 of the third body module 3, and correspond respectively in position to the first non-electrical connectors. The fourth non-electrical connectors are disposed at the second lateral connecting side 35 of the third body module 3, and correspond respectively in position to the second non-electrical connectors. The fifth non-electrical connectors are disposed at the rear connecting side 16 of the first body module 1, at the rear connecting side 26 of the second body module 2 and at the rear connecting side 36 of the third body module 3. The sixth non-electrical connectors are disposed at the front connecting side 44 of the fourth body module 4, and correspond respectively in position to the fifth non-electrical connectors. The first back plate connectors are disposed at the first back plate 14. The first chassis connectors are disposed at the first chassis 12, and correspond respectively in position to the first back plate connectors. The second back plate connectors are disposed at the second back plate 24. The second chassis connectors are disposed at the second chassis 22, and correspond respectively in position to the second back plate connectors. The third back plate connectors are disposed at the third back plate 33. The third chassis connectors are disposed at the third chassis 32, and correspond respectively in position to the third back plate connectors.

In this embodiment, each of the first, fourth and sixth non-electrical connectors and the first, second and third back plate connectors is configured as a male non-electrical connector 83, and each of the second, third and fifth non-electrical connectors and the first, second and third chassis connectors is configured as a female non-electrical connector 84 that is able to be coupled to the male non-electrical connector 83. The locations of each corresponding pair of the male and female non-electrical connectors 83, 84 are interchangeable. Note that, in FIGS. 1 and 2, each of the male non-electrical connectors 83 is expressed by a hemisphere, and each of the female non-electrical connectors 84 is expressed by a circle.

For the sake of brevity, only one of the first non-electrical connectors and one of the third non-electrical connectors are described in the following paragraphs. Referring to FIGS. 1, 2, 14 and 15, the first non-electrical connector (i.e., the male non-electrical connector 83) includes an inner seat 831, and an outer connecting seat that is rotatably sleeved on the inner seat 831. The inner seat 811 is fixedly disposed on the lateral connecting side 15 of the first body module 1, and is formed with a recess 831a. The outer connecting seat includes a rotating section 832, a casing section 833 and two wing sections 834. The rotating section 832 is rotatably sleeved on the inner seat 831. The casing section 833 is co-rotatably sleeved on the rotating section 832. The wing sections 834 respectively extend radially and outwardly from two diametrically opposite sides of the casing section 833.

The third non-electrical connector (i.e., the female non-electrical connector 84) includes a mounting seat 841 that is disposed in the first lateral connecting side 34 of the third body module 3. The mounting seat 841 has a retaining groove 842 that is formed in an outer surface of the mounting seat 841 and that is shaped to be substantially complementary to the first non-electrical connector, and a protrusion 841a that is disposed in the retaining groove 842 and that is able to engage the recess 831a of the inner seat 831 of the first non-electrical connector. The retaining groove 842 has two extending groove portions 842a that are respectively located at two diametrically opposite sides of the protrusion 841a and extend about the protrusion 841a.

To couple the first and third non-electrical connectors together, the outer connecting seat of the first non-electrical connector is inserted into the retaining groove 842 of the third non-electrical connector, so that the protrusion 841a is inserted into the recess 831a of the inner seat 831 of the first non-electrical connector. Then, the outer connecting seat is rotated by an electromechanical control manner to respectively engage the wing sections 834 with the extending groove portions 842a, so as to maintain the connection between the first and third non-electrical connectors.

Referring to FIGS. 1 to 3, the connecting blocks 85 are disposed at the lateral connecting side 25 of the second body module 2, the first lateral connecting side 34 of the third body module 3 and the front connecting side 44 of the fourth body module 4. The connecting grooves 86 are disposed at the lateral connecting side 15 of the first body module 1, the second lateral connecting side 35 of the third body module 3, the rear connecting side 16 of the first body module 1, the rear connecting side 26 of the second body module 2 and the rear connecting side 36 of the third body module 3.

The connecting blocks 85 disposed at the lateral connecting side 25 of the second body module 2 respectively correspond in position to the connecting grooves 86 disposed at the lateral connecting side 15 of the first body module 1. The connecting blocks 85 disposed at the first lateral connecting side 34 of the third body module 3 respectively correspond in position to the connecting grooves 86 disposed at the lateral connecting side 15 of the first body module 1. The connecting grooves 86 disposed at the second lateral connecting side 35 of the third body module 3 respectively correspond in position to the connecting blocks 85 disposed at the lateral connecting side 25 of the second body module 2. The connecting blocks 85 disposed at the front connecting side 44 of the fourth body module 4 respectively correspond in position to the connecting grooves 86 disposed at the rear connecting side 16 of the first body module 1, the rear connecting side 26 of the second body module 2 and the rear connecting side 36 of the third body module 3. The locations of each corresponding pair of the connecting block 85 and the connecting groove 86 are interchangeable.

Referring to FIGS. 3 and 4, the controller 9 is disposed at the first body module 1, and is electrically coupled to the first driving motors 61, the first battery 71 and the first and fifth electrical connectors. When the vehicle body unit 10 is assembled into the second augmented configuration, the controller 9 is electrically coupled to the second and third driving motors 61 and the second, third and fourth batteries 72, 73, 74 by virtue of the first to sixth electrical connectors, so as to control the first, second and third driving motors 61, 62, 63 to drive rotation of each of the first, second and third wheels 51, 52, 53. In this embodiment, the controller 9 includes a steering wheel (not shown), and an engine control unit (ECU) for control each of the first, second and third driving motors 61, 62, 63. It should be further noted that each of the suspension mechanisms 58 may cooperate with an independent steering mechanism (not shown) that is electrically coupled to the controller 9 for independently steering the corresponding wheel 51, 52, 53 in a desired direction.

To assemble the vehicle body unit 10 into the basic configuration (see FIGS. 16 to 18), each of the suspension mechanisms 58 (see FIG. 1) that are mounted to the first and second body modules 1, 2 is switched into the semi-folded state, so that the first wheels 51 and the first auxiliary wheel 54 cooperatively support the first body module 1, and the second wheels 52 and the second auxiliary wheel 55 cooperatively support the second body module 2. Then, each of the first electrical connectors is operated to be electrically coupled to the corresponding one of the second electrical connectors, each of the first non-electrical connectors is operated to be coupled to the corresponding one of the second non-electrical connectors, the connecting blocks 85 disposed at the lateral connecting side 25 of the second body module 2 are respectively coupled to the connecting grooves 86 disposed at the lateral connecting side 15 of the first body module 1, and the slide rod 221 of the second body module 2 engages the slide groove 121 of the first body module 1, so that the first and second body modules 1, 2 are electrically and firmly interconnected. The first back plate connectors are operated to be respectively coupled to the first chassis connectors, and the second back plate connectors are operated to be respectively coupled to the second chassis connectors. Finally, each of the suspension mechanisms 58 mounted to the first and second body modules 1, 2 is switched into the unfolded state, so that the first and second wheels 51, 52 cooperatively support the first and second body modules 1, 2, and the first and second auxiliary wheels 54, 55 are spaced apart from the ground (G). At this time, the first and second body modules 1, 2 cooperatively define a first retaining space (S1) therebetween that is suitable for only one passenger and that may be provided with a car seat (not shown). The controller 9 is electrically coupled to the second battery 72 and the second driving motors 62 by virtue of the first and second electrical connectors. In this embodiment, when the vehicle body unit 10 is assembled into the basic configuration, the first and second batteries 71, 72 are connected in parallel to provide electrical power to the controller 9 and the first and second driving motors 61, 62 for driving the first and second wheels 51, 52. Note that the basic configuration of the vehicle body unit 10 is much lighter than the total weight of the first to fourth body modules 1, 2, 3, 4, so that the energy consumption of the basic configuration is considerably reduced.

To assemble the vehicle body unit 10 into the first augmented configuration (see FIGS. 19 to 21), each of the suspension mechanisms 58 (see FIG. 10) that are mounted to the first and second body modules 1, 2 is switched into the semi-folded state, so that the first wheels 51 and the first auxiliary wheel 54 cooperatively support the first body module 1, and the second wheels 52 and the second auxiliary wheel 55 cooperatively support the second body module 2. At this time, a distance between the first body module 1 and the ground (G) is the same to that between the second body module 2 and the ground (G) and that between the third body module 3 and the ground (G). Then, each of the first electrical connectors is operated to be electrically coupled to the corresponding one of the third electrical connectors, each of the fourth electrical connectors is operated to be electrically coupled to the corresponding one of the second electrical connectors, each of the first non-electrical connectors is operated to be coupled to the corresponding one of the third non-electrical connectors, each of the fourth non-electrical connectors is operated to be coupled to the corresponding one of the second non-electrical connectors, the connecting blocks 85 disposed at the lateral connecting side 25 of the second body module 2 are respectively coupled to the connecting grooves 86 disposed at the second lateral connecting side 35 of the third body module 3, the connecting blocks 85 disposed at the first lateral connecting side 34 of the third body module 3 are respectively coupled to the connecting grooves 86 disposed at the lateral connecting side 15 of the first body module 1, and the slide rod 221 of the second body module 2 partially engages the slide groove 121 of the first body module 1 and is partially retained in the third body module 3, so that the first, second and third body modules 1, 2, 3 are electrically and firmly interconnected. The first back plate connectors are operated to be respectively coupled to the first chassis connectors, the second back plate connectors are operated to be respectively coupled to the second chassis connectors, and the third back plate connectors are operated to be respectively coupled to the third chassis connectors. Finally, each of the suspension mechanisms 58 mounted to the first and second body modules 1, 2 is switched into the unfolded state, so that the first and second wheels 51, 52 cooperatively support the first, second and third body modules 1, 2, 3, and the first, second and third auxiliary wheels 54, 55, 56 are spaced apart from the ground (G). At this time, the first, second and third body modules 1, 2, 3 cooperatively define a second retaining space (S2) thereamong that is suitable for two passengers and that may be provided with at least one car seat (not shown). The controller 9 is electrically coupled to the second and third batteries 72, 73 and the second driving motors 62 by virtue of the first to fourth electrical connectors. In this embodiment, when the vehicle body unit 10 is assembled into the first augmented configuration, the first, second and third batteries 71, 72, 73 are connected in parallel to provide electrical power to the controller 9 and the first and second driving motors 61, 62 for driving the first and second wheels 51, 52. Note that the first augmented configuration of the vehicle body unit 10 is also apparently lighter than the total weight of the first to fourth body modules 1, 2, 3, 4, so that the energy consumption of the first augmented configuration is considerably reduced.

To assemble the vehicle body unit 10 from the first augmented configuration (see FIGS. 19 to 21) into the second augmented configuration (see FIG. 22), each of the suspension mechanisms 58 (see FIG. 10) that are mounted to the first and second body modules 1, 2 is switched into the semi-folded state, so that the first wheels 51 and the first auxiliary wheel 54 cooperatively support the first body module 1, and the second wheels 52 and the second auxiliary wheel 55 cooperatively support the second body module 2. Each of the suspension mechanisms 58 that are mounted to the fourth body modules 4 is switched into the semi-folded state, so that the third wheels 53 and the third auxiliary wheel 56 cooperatively support the fourth body module 4. At this time, a distance between the first body module 1 and the ground (G) is the same to that between the second body module 2 and the ground (G), that between the third body module 3 and the ground (G) and that between the fourth body module 4 and the ground (G). Then, the sixth electrical connector is operated to be electrically coupled to the fifth electrical connectors, each of the sixth non-electrical connectors is operated to be coupled to the corresponding one of the fifth non-electrical connectors, the connecting blocks 85 disposed at the front connecting side 44 of the fourth body module 4 are respectively coupled to the connecting grooves 86 disposed at the rear connecting side 16 of the first body module 1, the rear connecting side 26 of the second body module 2 and the rear connecting side 36 of the third body module 3, so that the fourth body module 4 is electrically and firmly connected to the first, second and third body modules 1, 2, 3. Finally, Referring further to FIG. 7, the suspension mechanisms 58 mounted with one of the first wheels 51 that is distal from the fourth body module 4 is switched into the unfolded state, the suspension mechanisms 58 mounted with the other one of the first wheels 51 that is proximate to the fourth body module 4 is switched into the folded state, the suspension mechanisms 58 mounted with one of the second wheels 52 that is distal from the fourth body module 4 is switched into the unfolded state, the suspension mechanisms 58 mounted with the other one of the second wheels 52 that is proximate to the fourth body module 4 is switched into the folded state, each of the suspension mechanisms 58 mounted to the fourth body module 4 is switched into the unfolded state, so that the one of the first wheels 51 distal from the fourth body module 4, the one of the second wheels 52 distal from the fourth body module 4 and the third wheels 53 cooperatively support the first, second, third and fourth body modules 1, 2, 3, 4, and the first, second and third auxiliary wheels 54, 55, 56, the other one of the first wheels 51 proximate the fourth body module 4 and the other one of the second wheels 52 proximate the fourth body module 4 are spaced apart from the ground (G). The first back plate 14 of the first body module 1, the second back plate 24 of the second body module 2, the third back plate 33 of the third body module 3, and the lateral and rear walls 42, 43 of the fourth body module 4 cooperatively define a third retaining space (S3) thereamong that opens upwardly and that is for retaining goods. The controller 9 is electrically coupled to the second, third and fourth batteries 72, 73, 74, and the second and third driving motors 62, 63 by virtue of the first to sixth electrical connectors. In this embodiment, when the vehicle body unit 10 is assembled into the second augmented configuration, the first, second, third and fourth batteries 71, 72, 73, 74 are connected in parallel to provide electrical power to the controller 9 and the first, second and third driving motors 61, 62, 63 for driving the one of the first wheels 51, the one of the second wheels 52 and the third wheels 53. In a variation of the embodiment, the suspension mechanisms 58 mounted with the other one of the first wheels 51 may not be switched into the folded state, and the suspension mechanisms 58 mounted with the other one of the second wheels 52 may not be switched into the folded state. The other one of the first wheels 51 and the other one of the second wheels 52 may be driven by the corresponding driving motors.

Figure 5:
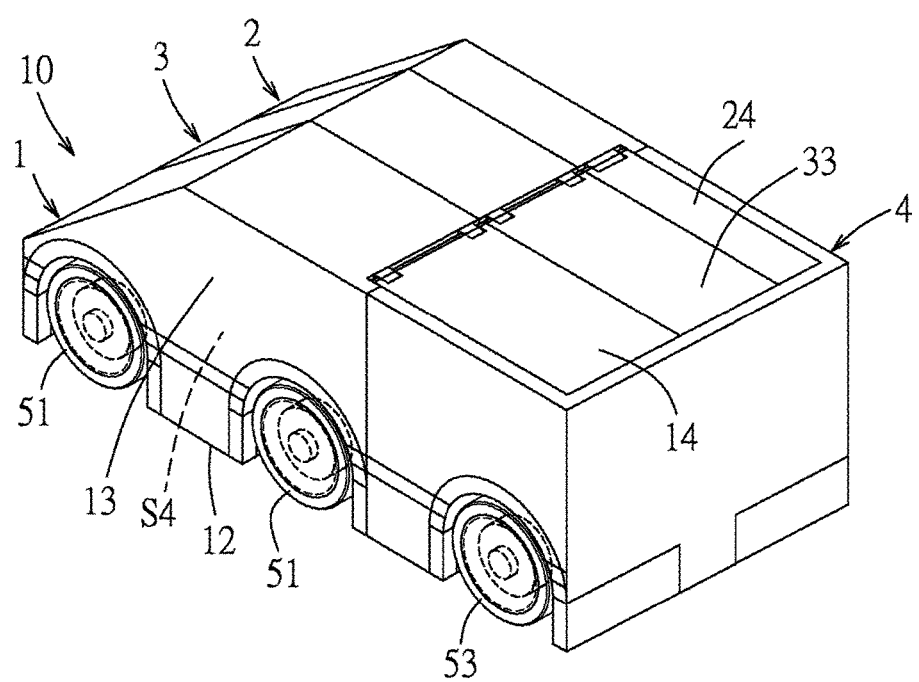
FIG. 5 is a schematic perspective view illustrating the second augmented configuration of the vehicle body unit.

Referring further to FIG. 5, before the fourth body module 4 being connected to the first, second and third body modules 1, 2, 3, the first back plate 14 of the first body module 1 can be rotated to be flush with the first roof 11, the second back plate 24 of the second body module 2 can be rotated to be flush with the second roof 21, and the third back plate 33 of the third body module 3 can be rotated to be flush with the third roof 31, so that after the vehicle body unit 10 is assembled into the second augmented configuration, the first, second, third and fourth body modules 1, 2, 3, 4 cooperatively define a fourth retaining space (S4) thereamong that is suitable for four passengers and that may be provided with at least one car seat (not shown).

To sum up, since the vehicle body unit 10 of this disclosure includes the first, second, third and fourth body modules 1, 2, 3, 4 that can be selectively assembled into different configurations for different demands. The base configuration and the first augmented configuration of the vehicle body unit 10 are apparently lighter than the total weight of the first to fourth body modules 1, 2, 3, 4, so that the energy consumption of the basic configuration and the first augmented configuration is considerably reduced.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," "an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A modular electric vehicle comprising:
   a vehicle body unit including a first body module and a second body module, said first body module having a lateral connecting side, said second body module having a lateral connecting side;
   a wheel unit including two first wheels that are mounted to said first body module and that are arranged in a front-rear direction, and two second wheels that are mounted to said second body module and that are arranged in the front-rear direction;
   a driving unit including a first driving motor for driving rotation of one of said first wheels, and a second driving motor for driving rotation of one of said second wheels;
   a power source unit providing electrical power for driving said modular electric vehicle, and including a first battery that is disposed on said first body module;
   a connection unit including a first electrical connector that is disposed at said lateral connecting side of said first body module, and a second electrical connector that is disposed at said lateral connecting side of said second body module, that corresponds in position to said first electrical connector, and that is electrically coupled to said second driving motor; and
   a controller disposed at said first body module, and electrically coupled to said first driving motor, said first battery and said first electrical connector;
   wherein, said first electrical connector is operable to be selectively and electrically coupled to said second electrical connector, so that said controller is able to be electrically coupled to said second driving motor by virtue of said first and second electrical connectors, and that said first battery provides electrical power to said controller and said first and second driving motors for driving the one of said first wheels and the one of said second wheels;
   wherein one of said first and second electrical connectors is configured as a female electrical connector, and the other one of said first and second electrical connectors is configured as a male electrical connector that is operable to be electrically coupled to said female electrical connector;
   wherein the other one of said first and second electrical connectors includes an inner terminal seat, an outer connecting seat and a plurality of conductive terminals, said inner terminal seat being fixedly disposed on said lateral connecting side of the corresponding one of said first and second body modules, said outer connecting seat being rotatably mounted to said inner terminal seat, and having two wing sections that radially extend away from each other, said conductive terminals being disposed on said inner terminal seat;
   wherein the one of said first and second electrical connectors includes a mounting seat disposed in said lateral connecting side of the corresponding one of said first and second body modules, and a plurality of electrical contacts, said mounting seat being formed with a retaining groove, and a plurality of terminal holes that are in spatial communication with said retaining groove, said retaining groove having two extending groove portions that are diametrically opposite to each other, said electrical contacts being respectively disposed in said terminal holes; and
   wherein when said first and second electrical connectors are electrically coupled, said outer connecting seat is retained in said retaining groove, said conductive terminals are respectively inserted into said terminal holes, and are respectively in contact with said electrical contacts, and said wing sections of said outer connecting seat respectively engage said extending groove portions of said retaining groove by rotating said outer connecting seat, so as to maintain the electrical connection between said first and second electrical connectors.

2. A modular electric vehicle comprising:

a vehicle body unit including a first body module and a second body module, said first body module having a lateral connecting side, said second body module having a lateral connecting side;

a wheel unit including two first wheels that are mounted to said first body module and that are arranged in a front-rear direction, and two second wheels that are mounted to said second body module and that are arranged in the front-rear direction;

a driving unit including a first driving motor for driving rotation of one of said first wheels, and a second driving motor for driving rotation of one of said second wheels;

a power source unit providing electrical power for driving said modular electric vehicle, and including a first battery that is disposed on said first body module;

a connection unit including a first electrical connector that is disposed at said lateral connecting side of said first body module, and a second electrical connector that is disposed at said lateral connecting side of said second body module, that corresponds in position to said first electrical connector, and that is electrically coupled to said second driving motor; and a controller disposed at said first body module, and electrically coupled to said first driving motor, said first battery and said first electrical connector;

wherein, said first electrical connector is operable to be selectively and electrically coupled to said second electrical connector, so that said controller is able to be electrically coupled to said second driving motor by virtue of said first and second electrical connectors, and that said first battery provides electrical power to said controller and said first and second driving motors for driving the one of said first wheels and the one of said second wheels;

wherein said connection unit further includes a first non-electrical connector that is disposed at said lateral connecting side of said first body module, and a second non-electrical connector that is disposed at said lateral connecting side of said second body module and that corresponds in position to said first non-electrical connector, said first non-electrical connector being operable to be selectively coupled to said second non-electrical connector;

wherein one of said first and second non-electrical connectors is configured as a female non-electrical connector, and the other one of said first and second non-electrical connectors is configured as a male non-electrical connector that is operable to be coupled to said female non-electrical connector; and wherein:

the other one of said first and second non-electrical connectors includes an inner seat and an outer connecting seat, said inner seat being fixedly disposed on said lateral connecting side of the corresponding one of said first and second body modules, said outer connecting seat being rotatably mounted to said inner seat, and having two wing sections that radially extend away from each other;

the one of said first and second non-electrical connectors includes a mounting seat disposed in said lateral connecting side of the corresponding one of said first and second body modules, said mounting seat being formed with a retaining groove, said retaining groove having two extending groove portions that are diametrically opposite to each other; and when said first and second non-electrical connectors are coupled, said outer connecting seat is retained in said retaining groove, and said wing sections of said outer connecting seat respectively engage said extending groove portions of said retaining groove by rotating said outer connecting seat, so as to maintain the connection between said first and second non-electrical connectors.

3. A modular electric vehicle comprising:

a vehicle body unit including a first body module and a second body module, said first body module having a lateral connecting side, said second body module having a lateral connecting side;

a wheel unit including two first wheels that are mounted to said first body module and that are arranged in a front-rear direction, and two second wheels that are mounted to said second body module and that are arranged in the front-rear direction;

a driving unit including a first driving motor for driving rotation of one of said first wheels, and a second driving motor for driving rotation of one of said second wheels;

a power source unit providing electrical power for driving said modular electric vehicle, and including a first battery that is disposed on said first body module;

a connection unit including a first electrical connector that is disposed at said lateral connecting side of said first body module, and a second electrical connector that is disposed at said lateral connecting side of said second body module, that corresponds in position to said first electrical connector, and that is electrically coupled to said second driving motor; and a controller disposed at said first body module, and electrically coupled to said first driving motor, said first battery and said first electrical connector;

wherein, said first electrical connector is operable to be selectively and electrically coupled to said second electrical connector, so that said controller is able to be electrically coupled to said second driving motor by virtue of said first and second electrical connectors, and that said first battery provides electrical power to said controller and said first and second driving motors for driving the one of said first wheels and the one of said second wheels; and wherein:

said vehicle body unit further includes a third body module that has a first lateral connecting side, and a second lateral connecting side opposite to said first lateral connecting side;

said power source unit further includes a second battery that is disposed on said second body module and that is electrically coupled to said second electrical connector, and a third battery that is disposed on said third body module;

said connection unit further includes a third electrical connector and a fourth electrical connector, said third electrical connector being disposed at said first lateral connecting side of said third body module, and corresponding in position to said first electrical connector, said fourth electrical connector being disposed at said second lateral connecting side of said third body module, corresponding in position to said second electrical connector, and being electrically coupled to said third electrical connector and said third battery; and said first electrical connector is operable to be selectively and electrically coupled to said third electrical connector and said fourth electrical connector is operable to be selectively and electrically coupled to said second electrical connector, so that said controller is able to be electrically coupled to said second driving motor by virtue of said first, second, third and fourth electrical connectors, and that said first, second and third batteries provide electrical power to said controller and said first and second driving motors for driving the one of said first wheels and the one of said second wheels.

4. The modular electric vehicle as claimed in claim 3, wherein said first body module further has a slide groove, said second body module further having a slide rod that slidably and removably engages said slide groove of said first body module.

5. The modular electric vehicle as claimed in claim 4, wherein said wheel unit further includes a first auxiliary wheel that is mounted to said first body module and that is non-collinear with said first wheels, a second auxiliary wheel that is mounted to said second body module and that is non-collinear with said second wheels, and three third auxiliary wheels that are mounted to said third body module and that are non-collinear with each other.

6. The modular electric vehicle as claimed in claim 5, wherein said wheel unit further includes four suspension mechanisms, each of said first and second wheels being mounted to the corresponding one of said first and second body modules by virtue of a respective one of said suspension mechanisms, each of said suspension mechanisms being for adjusting the position of the corresponding one of said first and second wheels relative to the corresponding one of said first and second body modules, and being operable to switch among an unfolded state where the corresponding one of said first and second wheels is closer to a ground than a corresponding one of said first and second auxiliary wheels that is mounted to the corresponding one of said first and second body modules, and a semi-folded state where lower ends of the corresponding one of said first and second wheels and the corresponding one of said first and second auxiliary wheels are at the same level.

7. The modular electric vehicle as claimed in claim 6, wherein each of said suspension mechanisms includes a bracket that is fixedly mounted to the corresponding one of said first and second body modules, an upper arm that is pivoted to an upper portion of said bracket, a lower arm that is pivoted to a lower portion of said bracket and that is longer than said upper arm, a support member that is connected between said upper and lower arms and that is mounted with an axle portion of the corresponding one of said first and second wheels, and a resilient rod member that has opposite ends respectively pivoted to said upper portion of said bracket and said lower arm, said lower arm of each of said suspension mechanisms pivoting relative to said bracket of said suspension mechanism upon lengthwise variation of said resilient rod member of said suspension mechanism, so as to move said support member of said suspension mechanism and the corresponding one of said first and second wheels relative to the corresponding one of said first and second body modules.

8. The modular electric vehicle as claimed in claim 3, wherein one of said first and second electrical connectors is configured as a female electrical connector, the other one of said first and second electrical connectors being configured as a male electrical connector that is operable to be electrically coupled to said female electrical connector, said third electrical connector being substantially the same as said second electrical connector, said fourth electrical connector being substantially the same as said first electrical connector.

9. The modular electric vehicle as claimed in claim 8, wherein:
the other one of said first and second electrical connectors includes an inner terminal seat, an outer connecting seat and a plurality of conductive terminals, said inner terminal seat being fixedly disposed on said lateral connecting side of the corresponding one of said first and second body modules, said outer connecting seat being rotatably mounted to said inner terminal seat, and having two wing sections that radially extend away from each other, said conductive terminals being disposed on said inner terminal seat;
the one of said first and second electrical connectors includes a mounting seat disposed in said lateral connecting side of the corresponding one of said first and second body modules, and a plurality of electrical contacts, said mounting seat being formed with a retaining groove, and a plurality of terminal holes that are in spatial communication with said retaining groove, said retaining groove having two extending groove portions that are diametrically opposite to each other, said electrical contacts being respectively disposed in said terminal holes;
one of said third and fourth electrical connectors that is substantially the same as the other one of said first and second electrical connectors includes an inner terminal seat, an outer connecting seat and a plurality of conductive terminals, said inner terminal seat being fixedly disposed on the corresponding one of said first and second lateral connecting sides of said third body module, said outer connecting seat being rotatably mounted to said inner terminal seat, and having two wing sections that radially extend away from each other, said conductive terminals being disposed on said inner terminal seat;
the other one of said third and fourth electrical connectors that is substantially the same as the one of said first and second electrical connectors includes a mounting seat disposed in the corresponding one of said first and second lateral connecting sides of said third body module, and a plurality of electrical contacts, said mounting seat being formed with a retaining groove, and a plurality of terminal holes that are in spatial communication with said retaining groove, said retaining groove having two extending groove portions that are diametrically opposite to each other, said electrical contacts being respectively disposed in said terminal holes;
when said first and third electrical connectors are electrically coupled, said outer connecting seat is retained in said retaining groove, said conductive terminals are respectively inserted into said terminal holes, and are respectively in contact with said electrical contacts, and said wing sections of said outer connecting seat respectively engage said extending groove portions of said retaining groove by rotating said outer connecting seat, so as to maintain the electrical connection between said first and third electrical connectors; and
when said fourth and second electrical connectors are electrically coupled, said outer connecting seat is retained in said retaining groove, said conductive terminals are respectively inserted into said terminal holes, and are respectively in contact with said electrical contacts, and said wing sections of said outer connecting seat respectively engage said extending groove portions of said retaining groove by rotating said outer connecting seat, so as to maintain the electrical connection between said fourth and second electrical connectors.

10. The modular electric vehicle as claimed in claim 8, wherein said connection unit further includes a first non-electrical connector that is disposed at said lateral connecting side of said first body module, a second non-electrical connector that is disposed at said lateral connecting side of said second body module and that corresponds in position to said first non-electrical connector, a third non-electrical connector that is disposed at said first lateral connecting side of said third body module and that corresponds in position to said first non-electrical connector, and a fourth non-electrical connector that is disposed at said second lateral connecting side of said third body module and that corresponds in position to said second non-electrical connector, said first non-electrical connector being operable to be selectively coupled to said third non-electrical connector, said fourth non-electrical connector being operable to be selectively coupled to said second non-electrical connector.

11. The modular electric vehicle as claimed in claim 10, wherein one of said first and second non-electrical connectors is configured as a female non-electrical connector, and the other one of said first and second non-electrical connectors is configured as a male non-electrical connector that is operable to be coupled to said female non-electrical connector, said third non-electrical connector being substantially the same as said second non-electrical connector, said fourth non-electrical connector being substantially the same as said first non-electrical connector.

12. The modular electric vehicle as claimed in claim 11, wherein:
the other one of said first and second non-electrical connectors includes an inner seat and an outer connecting seat, said inner seat being fixedly disposed on said lateral connecting side of the corresponding one of said first and second body modules, said outer connecting seat being rotatably mounted to said inner seat, and having two wing sections that radially extend away from each other;
the one of said first and second non-electrical connectors includes a mounting seat disposed in said lateral connecting side of the corresponding one of said first and second body modules, said mounting seat being formed with a retaining groove, said retaining groove having two extending groove portions that are diametrically opposite to each other;
one of said third and fourth non-electrical connectors that is substantially the same as the other one of said first and second non-electrical connectors includes an inner seat and an outer connecting seat, said inner seat being fixedly disposed on the corresponding one of said first and second lateral connecting sides of said third body module, said outer connecting seat being rotatably mounted to said inner seat, and having two wing sections that radially extend away from each other;
the other one of said third and fourth non-electrical connectors that is substantially the same as the one of said first and second non-electrical connectors includes a mounting seat disposed in the corresponding one of said first and second lateral connecting sides of said third body module, said mounting seat being formed with a retaining groove, said retaining groove having two extending groove portions that are diametrically opposite to each other;
when said first and third non-electrical connectors are coupled, said outer connecting seat is retained in said retaining groove, and said wing sections of said outer connecting seat respectively engage said extending groove portions of said retaining groove by rotating said outer connecting seat, so as to maintain the connection between said first and third non-electrical connectors; and
when said fourth and second non-electrical connectors are coupled, said outer connecting seat is retained in said retaining groove, and said wing sections of said outer connecting seat respectively engage said extending groove portions of said retaining groove by rotating said outer connecting seat, so as to maintain the connection between said fourth and second non-electrical connectors.

13. The modular electric vehicle as claimed in claim 3, wherein said connection unit further includes two connecting blocks that are respectively disposed at said lateral connecting side of said first body module and said second lateral connecting side of said third body module or respectively disposed at said lateral connecting side of said second body module and said first lateral connecting side of said third body module, and two connecting grooves that are respectively disposed at the remaining two of said lateral connecting sides of said first and second body modules and said first and second lateral connecting sides of said third body module, each of said connecting blocks corresponding in position to each of said connecting grooves, said connecting block that is disposed at said first or second body modules being operable to be selectively coupled to one of said connecting grooves, said connecting grooves that is disposed at said first or second body modules being operable to be selectively coupled to one of said connecting blocks.

14. The modular electric vehicle as claimed in claim 3, wherein:
said vehicle body unit further includes a fourth body module that has a front connecting side, said first body module further has a rear connecting side, said second body module further has a rear connecting side, said third body module further has a rear connecting side;
said wheel unit further includes two third wheels that are mounted to said fourth body module and that are spaced apart from each other in a lateral direction;
said driving unit further includes a third driving motor for driving rotation of one of said third wheels;
said power source unit further includes a fourth battery that is disposed on said fourth body module;
said connection unit further includes a fifth electrical connector and a sixth electrical connector, said fifth electrical connector being disposed at said rear connecting side of said first body module and being electrically coupled to said controller, said sixth electrical connector being disposed at said front connecting side of said fourth body module, corresponding in position to said fifth electrical connector, and being electrically coupled to said third driving motor and said fourth battery; and
said first electrical connector is operable to be selectively and electrically coupled to said third electrical connector, said fourth electrical connector is operable to be selectively and electrically coupled to said second electrical connector, and said sixth electrical connector is operable to be electrically coupled to said fifth electrical connector, so that said controller is able to be electrically coupled to said second and third driving motors by virtue of said first, second, third, fourth, fifth and sixth electrical connectors, and that said first, second, third and fourth batteries provide electrical power to said controller and said first, second and third driving motors for driving the one of said first wheels, the one of said second wheels and the one of said third wheels.

15. The modular electric vehicle as claimed in claim 14, wherein said wheel unit further includes a first auxiliary wheel that is mounted to said first body module and that is non-collinear with said first wheels, a second auxiliary wheel that is mounted to said second body module and that is non-collinear with said second wheels, three third auxiliary wheels that are mounted to said third body module and that are non-collinear with each other, and a fourth auxiliary wheel that is mounted to said fourth body module and that is non-collinear with said third wheels.

16. The modular electric vehicle as claimed in claim 15, wherein said wheel unit further includes six suspension mechanisms, each of said first, second and third wheels being mounted to the corresponding one of said first, second and fourth body modules by virtue of a respective one of said suspension mechanisms, each of said suspension mechanisms being for adjusting the position of the corresponding one of said first, second and third wheels relative to the corresponding one of said first, second and fourth body modules, and being operable to switch among an unfolded state where the corresponding one of said first, second and third wheels is closer to a ground than a corresponding one of said first, second and third auxiliary wheels that is mounted to the corresponding one of said first, second and fourth body modules, and a semi-folded state where lower ends of the corresponding one of said first, second and third wheels and the corresponding one of said first, second and third auxiliary wheels are at the same level.

17. The modular electric vehicle as claimed in claim 16, wherein each of said suspension mechanisms includes a bracket that is fixedly mounted to the corresponding one of said first, second and fourth body modules, an upper arm that is pivoted to an upper portion of said bracket, a lower arm that is pivoted to a lower portion of said bracket and that is longer than said upper arm, a support member that is connected between said upper and lower arms and that is mounted with an axle portion of the corresponding one of said first, second and third wheels, and a resilient rod member that has opposite ends respectively pivoted to said upper portion of said bracket and said lower arm, said lower arm of each of said suspension mechanisms pivoting relative to said bracket of said suspension mechanism upon lengthwise variation of said resilient rod member of said suspension mechanism, so as to move said support member of said suspension mechanism and the corresponding one of said first, second and third wheels relative to the corresponding one of said first, second and fourth body modules.

18. The modular electric vehicle as claimed in claim 14, wherein one of said first and second electrical connectors is configured as a female electrical connector, the other one of said first and second electrical connectors being configured as a male electrical connector that is operable to be electrically coupled to said female electrical connector, said third electrical connector being substantially the same as said second electrical connector, said fourth electrical connector being substantially the same as said first electrical connector, one of said fifth and sixth electrical connectors being configured as said female electrical connector, the other one of said fifth and sixth electrical connectors being configured as said male electrical connector that is operable to be electrically coupled to said female electrical connector.

19. The modular electric vehicle as claimed in claim 18, wherein:
the other one of said first and second electrical connectors includes an inner terminal seat, an outer connecting seat and a plurality of conductive terminals, said inner terminal seat being fixedly disposed on said lateral connecting side of the corresponding one of said first and second body modules, said outer connecting seat being rotatably mounted to said inner terminal seat, and having two wing sections that radially extend away from each other, said conductive terminals being disposed on said inner terminal seat;
the one of said first and second electrical connectors includes a mounting seat disposed in said lateral connecting side of the corresponding one of said first and second body modules, and a plurality of electrical contacts, said mounting seat being formed with a retaining groove, and a plurality of terminal holes that are in spatial communication with said retaining groove, said retaining groove having two extending groove portions that are diametrically opposite to each other, said electrical contacts being respectively disposed in said terminal holes;
one of said third and fourth electrical connectors that is substantially the same as the other one of said first and second electrical connectors includes an inner terminal seat, an outer connecting seat and a plurality of conductive terminals, said inner terminal seat being fixedly disposed on the corresponding one of said first and second lateral connecting sides of said third body module, said outer connecting seat being rotatably mounted to said inner terminal seat, and having two wing sections that radially extend away from each other, said conductive terminals being disposed on said inner terminal seat;
the other one of said third and fourth electrical connectors that is substantially the same as the one of said first and second electrical connectors includes a mounting seat disposed in the corresponding one of said first and second lateral connecting sides of said third body module, and a plurality of electrical contacts, said mounting seat being formed with a retaining groove, and a plurality of terminal holes that are in spatial communication with said retaining groove, said retaining groove having two extending groove portions that are diametrically opposite to each other, said electrical contacts being respectively disposed in said terminal holes;
the other one of said fifth and sixth electrical connectors includes an inner terminal seat, an outer connecting seat and a plurality of conductive terminals, said inner terminal seat being fixedly disposed on the corresponding one of said rear connecting side of said first body module and said front connecting side of said fourth body module, said outer connecting seat being rotatably mounted to said inner terminal seat, and having two wing sections that radially extend away from each other, said conductive terminals being disposed on said inner terminal seat;
the one of said fifth and sixth electrical connectors includes a mounting seat disposed in the corresponding one of said rear connecting side of said first body module and said front connecting side of said fourth body module, and a plurality of electrical contacts, said mounting seat being formed with a retaining groove, and a plurality of terminal holes that are in spatial communication with said retaining groove, said retaining groove having two extending groove portions that are diametrically opposite to each other, said electrical contacts being respectively disposed in said terminal holes;

when said first and third electrical connectors are electrically coupled, said outer connecting seat is retained in said retaining groove, said conductive terminals are respectively inserted into said terminal holes, and are respectively in contact with said electrical contacts, and said wing sections of said outer connecting seat respectively engage said extending groove portions of said retaining groove by rotating said outer connecting seat, so as to maintain the electrical connection between said first and third electrical connectors;

when said fourth and second electrical connectors are electrically coupled, said outer connecting seat is retained in said retaining groove, said conductive terminals are respectively inserted into said terminal holes, and are respectively in contact with said electrical contacts, and said wing sections of said outer connecting seat respectively engage said extending groove portions of said retaining groove by rotating said outer connecting seat, so as to maintain the electrical connection between said fourth and second electrical connectors; and when said fifth and sixth electrical connectors are electrically coupled, said outer connecting seat is retained in said retaining groove, said conductive terminals are respectively inserted into said terminal holes, and are respectively in contact with said electrical contacts, and said wing sections of said outer connecting seat respectively engage said extending groove portions of said retaining groove by rotating said outer connecting seat, so as to maintain the electrical connection between said fifth and sixth electrical connectors.

20. The modular electric vehicle as claimed in claim 18, wherein said connection unit further includes a first non-electrical connector that is disposed at said lateral connecting side of said first body module, a second non-electrical connector that is disposed at said lateral connecting side of said second body module and that corresponds in position to said first non-electrical connector, a third non-electrical connector that is disposed at said first lateral connecting side of said third body module and that corresponds in position to said first non-electrical connector, a fourth non-electrical connector that is disposed at said second lateral connecting side of said third body module and that corresponds in position to said second non-electrical connector, a fifth non-electrical connector that is disposed at one of said rear connecting sides of said first, second and third body modules, and a sixth non-electrical connector that is disposed at said front connecting side of said fourth body module and that corresponds in position to said fifth non-electrical connector, said first non-electrical connector being operable to be selectively coupled to said third non-electrical connector, said fourth non-electrical connector being operable to be selectively coupled to said second non-electrical connector, said sixth non-electrical connector being operable to be coupled to said fifth non-electrical connector.

21. The modular electric vehicle as claimed in claim 20, wherein one of said first and second non-electrical connectors is configured as a female non-electrical connector, the other one of said first and second non-electrical connectors being configured as a male non-electrical connector that is operable to be coupled to said female non-electrical connector, said third non-electrical connector being substantially the same as said second non-electrical connector, said fourth non-electrical connector being substantially the same as said first non-electrical connector, one of said fifth and sixth non-electrical connectors is configured as said female non-electrical connector, the other one of said fifth and sixth non-electrical connectors being configured as said male non-electrical connector that is operable to be coupled to said female non-electrical connector.

22. The modular electric vehicle as claimed in claim 21, wherein:

the other one of said first and second non-electrical connectors includes an inner seat and an outer connecting seat, said inner seat being fixedly disposed on said lateral connecting side of the corresponding one of said first and second body modules, said outer connecting seat being rotatably mounted to said inner seat, and having two wing sections that radially extend away from each other;

the one of said first and second non-electrical connectors includes a mounting seat disposed in said lateral connecting side of the corresponding one of said first and second body modules, said mounting seat being formed with a retaining groove, said retaining groove having two extending groove portions that are diametrically opposite to each other;

one of said third and fourth non-electrical connectors that is substantially the same as the other one of said first and second non-electrical connectors includes an inner seat and an outer connecting seat, said inner seat being fixedly disposed on the corresponding one of said first and second lateral connecting sides of said third body module, said outer connecting seat being rotatably mounted to said inner seat, and having two wing sections that radially extend away from each other;

the other one of said third and fourth non-electrical connectors that is substantially the same as the one of said first and second non-electrical connectors includes a mounting seat disposed in the corresponding one of said first and second lateral connecting sides of said third body module, said mounting seat being formed with a retaining groove, said retaining groove having two extending groove portions that are diametrically opposite to each other;

the other one of said fifth and sixth non-electrical connectors includes an inner seat and an outer connecting seat, said inner seat being fixedly disposed on the corresponding one of said front connecting side of said fourth body module and said rear connecting sides of said first, second and third body modules, said outer connecting seat being rotatably mounted to said inner seat, and having two wing sections that radially extend away from each other;

the one of said fifth and sixth non-electrical connectors includes a mounting seat disposed in the corresponding one of said front connecting side of said fourth body module and said rear connecting sides of said first, second and third body modules, said mounting seat being formed with a retaining groove, said retaining groove having two extending groove portions that are diametrically opposite to each other;

when said first and third non-electrical connectors are coupled, said outer connecting seat is retained in said retaining groove, and said wing sections of said outer connecting seat respectively engage said extending groove portions of said retaining groove by rotating said outer connecting seat, so as to maintain the connection between said first and third non-electrical connectors;

when said fourth and second non-electrical connectors are coupled, said outer connecting seat is retained in said retaining groove, and said wing sections of said outer connecting seat respectively engage said extending groove portions of said retaining groove by rotating said outer connecting seat, so as to maintain the connection between said fourth and second non-electrical connectors; and when said fifth and sixth non-electrical connectors are coupled, said outer connecting seat is retained in said retaining groove, and said wing sections of said outer connecting seat respectively engage said extending groove portions of said retaining groove by rotating said outer connecting seat, so as to maintain the connection between said fifth and sixth non-electrical connectors.

23. The modular electric vehicle as claimed in claim 14, wherein:

said connection unit further includes two connecting blocks that are respectively disposed at said lateral connecting side of said first body module and said second lateral connecting side of said third body module or respectively disposed at said lateral connecting side of said second body module and said first lateral connecting side of said third body module, and two connecting grooves that are respectively disposed at the remaining two of said lateral connecting sides of said first and second body modules and said first and second lateral connecting sides of said third body module, each of said connecting blocks corresponding in position to each of said connecting grooves, said connecting block that is disposed at said first or second body modules being operable to be selectively coupled to one of said connecting grooves, said connecting grooves that is disposed at said first or second body modules being operable to be selectively coupled to one of said connecting blocks; and said connection unit further includes an first connecting structure that is disposed at said front connecting side of said fourth body module and that is configured as one of said connecting block and said connecting groove, and a second connecting structure that is disposed at one of said rear connecting sides of said first, second and third body modules and that is configured as the other one of said connecting block and said connecting groove.

24. The modular electric vehicle as claimed in claim 13, wherein:

said first body module further has a first roof, a first chassis that is spaced apart from said first roof in a top-bottom direction, a lateral wall that is opposite to said lateral connecting side in a lateral direction and that interconnects said first roof and said first chassis, and a first back plate that is pivotally connected to an end of said first roof;

said second body module further has a second roof, a second chassis that is spaced apart from said second roof in the top-bottom direction, a lateral wall that is opposite to said lateral connecting side in the lateral direction and that interconnects said second roof and said second chassis, and a second back plate that is pivotally connected to an end of said second roof;

said third body module further has a third roof, a third chassis that is spaced apart from said third roof in the top-bottom direction, and a third back plate that is pivotally connected to an end of said third roof;

said connection unit further includes a first back plate connector that is disposed at said first back plate, a first chassis connectors that is disposed at said first chassis and that corresponds in position to the first back plate connector, a second back plate connectors that is disposed at said second back plate, a second chassis connectors that is disposed at said second chassis and that corresponds in position to said second back plate connectors, a third back plate connectors that is disposed at said third back plate, and a third chassis connectors that is disposed at said third chassis and that corresponds in position to said third back plate connectors, one of said first back plate connector and said first chassis connector being configured as a female non-electrical connector, the other one of said first back plate connector and said first chassis connector being configured as a male non-electrical connector that is operable to be coupled to said female non-electrical connector, one of said second back plate connector and said second chassis connector being configured as said female non-electrical connector, the other one of said second back plate connector and said second chassis connector being configured as said male non-electrical connector that is operable to be coupled to said female non-electrical connector, one of said third back plate connector and said third chassis connector being configured as said female non-electrical connector, the other one of said third back plate connector and said third chassis connector being configured as said male non-electrical connector that is operable to be coupled to said female non-electrical connector; and said first, second and third body modules are operable to cooperatively define an enclosed second retaining space in such a manner that said third body module is disposed between said first and second body modules.

25. The modular electric vehicle as claimed in claim 23, wherein:

said first body module further has a first roof, a first chassis that is spaced apart from said first roof in a top-bottom direction, a lateral wall that is opposite to said lateral connecting side in a lateral direction and that interconnects said first roof and said first chassis, and a first back plate that is pivotally connected to an end of said first roof;

said second body module further has a second roof, a second chassis that is spaced apart from said second roof in the top-bottom direction, a lateral wall that is opposite to said lateral connecting side in the lateral direction and that interconnects said second roof and said second chassis, and a second back plate that is pivotally connected to an end of said second roof;

said third body module further has a third roof, a third chassis that is spaced apart from said third roof in the top-bottom direction, and a third back plate that is pivotally connected to an end of said third roof;

said fourth body module further has a fourth chassis, two lateral walls that respectively and upwardly extend from two opposite lateral edges of said fourth chassis, and a rear wall that extends upwardly from an rear edge of said fourth chassis and that interconnects said lateral walls;

said connection unit further includes a first back plate connector that is disposed at said first back plate, a first chassis connectors that is disposed at said first chassis and that corresponds in position to the first back plate connector, a second back plate connectors that is disposed at said second back plate, a second chassis connectors that is disposed at said second chassis and that corresponds in position to said second back plate connectors, a third back plate connectors that is disposed at said third back plate, and a third chassis connectors that is disposed at said third chassis and that corresponds in position to said third back plate connectors, one of said first back plate connector and said first chassis connector being configured as a female non-electrical connector, the other one of said first back plate connector and said first chassis connector being configured as a male non-electrical connector that is operable to be coupled to said female non-electrical connector, one of said second back plate connector and said second chassis connector being configured as said female non-electrical connector, the other one of said second back plate connector and said second chassis connector being configured as said male non-electrical connector that is operable to be coupled to said female non-electrical connector, one of said third back plate connector and said third chassis connector being configured as said female non-electrical connector, the other one of said third back plate connector and said third chassis connector being configured as said male non-electrical connector that is operable to be coupled to said female non-electrical connector; and said first, second and third body modules are operable to be assembled so as to cooperatively define an enclosed second retaining space in such a manner that said third body module is disposed between said first and second body modules, said fourth body module being operable to be assembled to said assembled first, second and third body modules in such a manner that said front connecting side of said fourth body module is coupled to said rear connecting sides of said first, second and third body modules, such that said first back plate of said first body module, said second back plate of said second body module, said third back plate of said third body module, and said lateral and rear walls of said fourth body module cooperatively define a third retaining space thereamong that opens upwardly.

26. The modular electric vehicle as claimed in claim 25, wherein said first back plate of said first body module is operable to rotate to be flush with said first roof, said second back plate of said second body module is operable to rotate to be flush with said second roof, and said third back plate of said third body module is operable to rotate to be flush with said third roof, such that said first, second, third and fourth body modules cooperatively define an enclosed fourth retaining space thereamong.

27. A modular electric vehicle comprising:
a vehicle body unit including a first body module and a second body module, said first body module having a lateral connecting side, said second body module having a lateral connecting side;
a wheel unit including two first wheels that are mounted to said first body module and that are arranged in a front-rear direction, and two second wheels that are mounted to said second body module and that are arranged in the front-rear direction;
a driving unit including a first driving motor for driving rotation of one of said first wheels, and a second driving motor for driving rotation of one of said second wheels;
a power source unit providing electrical power for driving said modular electric vehicle, and including a first battery that is disposed on said first body module;
a connection unit including a first electrical connector that is disposed at said lateral connecting side of said first body module, and a second electrical connector that is disposed at said lateral connecting side of said second body module, that corresponds in position to said first electrical connector, and that is electrically coupled to said second driving motor; and
a controller disposed at said first body module, and electrically coupled to said first driving motor, said first battery and said first electrical connector;

wherein, said first electrical connector is operable to be selectively and electrically coupled to said second electrical connector, so that said controller is able to be electrically coupled to said second driving motor by virtue of said first and second electrical connectors, and that said first battery provides electrical power to said controller and said first and second driving motors for driving the one of said first wheels and the one of said second wheels;

wherein said connection unit further includes a plurality of connecting blocks that are disposed at said lateral connecting side of one of said first and second body modules, and a plurality of connecting grooves that are disposed at said lateral connecting side of the other one of said first and second body modules and that respectively correspond in position to said connecting blocks, each of said connecting blocks being operable to be selectively coupled to the corresponding one of said connecting grooves; and wherein:
said first body module further has a first roof, a first chassis that is spaced apart from said first roof in a top-bottom direction, a lateral wall that is opposite to said lateral connecting side in a lateral direction and that interconnects said first roof and said first chassis, and a first back plate that is pivotally connected to an end of said first roof;
said second body module further has a second roof, a second chassis that is spaced apart from said second roof in the top-bottom direction, a lateral wall that is opposite to said lateral connecting side in the lateral direction and that interconnects said second roof and said second chassis, and a second back plate that is pivotally connected to an end of said second roof;
said connection unit further includes a first back plate connector that is disposed at said first back plate, a first chassis connectors that is disposed at said first chassis and that corresponds in position to the first back plate connector, a second back plate connectors that is disposed at said second back plate, and a second chassis connectors that is disposed at said second chassis and that corresponds in position to said second back plate connectors, one of said first back plate connector and said first chassis connector being configured as a female non-electrical connector, the other one of said first back plate connector and said first chassis connector being configured as a male non-electrical connector that is operable to be coupled to said female non-electrical connector, one of said second back plate connector and said second chassis connector being configured as said female non-electrical connector, the other one of said second back plate connector and said second chassis connector being configured as said male connector that is operable to be coupled to said female non-electrical connector; and said first and second body modules are operable to cooperatively define an enclosed first retaining space.

\* \* \* \* \*